US012756747B2

(12) United States Patent
Foti

(10) Patent No.: US 12,756,747 B2
(45) Date of Patent: Oct. 6, 2026

(54) ENHANCED SUBSCRIBER IDENTITY MODULE (ESIM) REMOTE PROVISIONING BASED SOLUTION TO PROVIDE IMS SERVICES TO A USER OF A PRIVATE NETWORK (NPN)

(71) Applicant: Telefonaktiebolaget LM Ericsson (publ), Stockholm (SE)

(72) Inventor: George Foti, Quebec (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 469 days.

(21) Appl. No.: 17/917,161

(22) PCT Filed: Apr. 6, 2021

(86) PCT No.: PCT/IB2021/052847
§ 371 (c)(1),
(2) Date: Oct. 5, 2022

(87) PCT Pub. No.: WO2021/205339
PCT Pub. Date: Oct. 14, 2021

(65) Prior Publication Data

US 2023/0164194 A1 May 25, 2023

Related U.S. Application Data

(60) Provisional application No. 63/016,590, filed on Apr. 28, 2020, provisional application No. 63/006,279, filed on Apr. 7, 2020.

(51) Int. Cl.
*H04L 65/1016* (2022.01)
*H04W 8/20* (2009.01)

(52) U.S. Cl.
CPC ......... *H04L 65/1016* (2013.01); *H04W 8/205* (2013.01)

(58) Field of Classification Search
CPC ............. H04L 41/0806; H04L 41/5054; H04L 65/1016; H04W 76/10
See application file for complete search history.

(56) References Cited

U.S. PATENT DOCUMENTS

| | | | | |
|---|---|---|---|---|
| 2018/0014339 | A1* | 1/2018 | Baek | H04W 92/045 |
| 2020/0275305 | A1* | 8/2020 | Huang-Fu | H04W 28/0268 |
| 2021/0152615 | A1* | 5/2021 | Karampatsis | H04L 65/1016 |

FOREIGN PATENT DOCUMENTS

| | | | |
|---|---|---|---|
| CN | 107113338 | A | 8/2017 |
| WO | 2016197295 | A1 | 12/2016 |

OTHER PUBLICATIONS

3rd Generation Partnership Project, "3rd Generation Partnership Project; Technical Specification Group Services and System Aspects; Study on enhanced support of non-public networks (Release 17)", Technical Report, 3GPP TR 23.700-07 V0.3.0, Jan. 1, 2020, pp. 1-42, 3GPP.

(Continued)

*Primary Examiner* — Zhensheng Zhang
(74) *Attorney, Agent, or Firm* — COATS & BENNETT, PLLC

(57) ABSTRACT

User Equipment (UEs) connected to a Standalone Non-Public Network (SNPN) receive Internet Protocol Multimedia Subsystem (IMS) and emergency services by using an Enhanced Subscriber Identity Module (eSIM) to onboard access IMS credentials needed by the UEs to access those services. Network nodes in the SNPN, such as a Session Management Function (SMF) and a Unified Data Management (UDM) function are also configured to support the onboarding of the credentials to the UEs. In particular, a UE receives remote provisioning information from a SMF. Upon receipt, the UE initiates a remote provisioning procedure and receives Internet access IMS subscription data
(Continued)

needed to establish a Packet Data Unit (PDU) session with an IMS network.

12 Claims, 29 Drawing Sheets

(56) References Cited

OTHER PUBLICATIONS

3rd Generation Partnership Project, "3rd Generation Partnership Project; Technical Specification Group Services and System Aspects; System architecture for the 5G System (5GS); Stage 2 (Release 16)", Technical Specification, 3GPP TS 23.501 V16.4.0, Mar. 1, 2020, pp. 1-430, 3GPP.
Ericsson, "KI #3, New Sol : eSIM based solution for Providing IMS voice and emergency services for SNPN subscribers.", 3GPP TSG-SA WG2 Meeting #139E, Elbonia, Jun. 1, 2020, pp. 1-7, S2-2003584, 3GPP.
Ericsson, "User Plane based solution to onboarding KI#4", 3GPP TSG-SA WG2 Meeting #136AH, Incheon, Korea, Jan. 13, 2020, pp. 1-7, S2-2000192, 3GPP.
GSMA, "IMS Profile for Voice and SMS", Official Document IR.92, Version 9.0, Apr. 8, 2015, pp. 1-40, GSM Association.

* cited by examiner

ENHANCED SUBSCRIBER IDENTITY MODULE (ESIM) REMOTE PROVISIONING BASED SOLUTION TO PROVIDE IMS SERVICES TO A USER OF A PRIVATE NETWORK (NPN)

RELATED APPLICATIONS

The present application claims benefit of U.S. Provisional Application 63/016,590, which was filed Apr. 28, 2020 and U.S. Provisional Application 63/006,279, which was filed Apr. 7, 2020, the disclosures of each of which are incorporated herein by reference in their entirety.

TECHNICAL FIELD

The present disclosure relates generally to communication networks, and more particularly, to providing Internet Protocol Multimedia System (IMS) services to User Equipment (UEs) connected to Standalone Non-Public Networks (SNPN).

BACKGROUND

Standalone Non-Public Networks (SNPN) using 5G technology will soon be widely deployed. As defined in 3GPP TS 23.501: "System architecture for the 5G System (5GS); Stage 2 (Release 16)" dated March 2020, there are different ways in which such networks can integrate with public 5G networks. However, given the number of ways in which SNPNs can integrate with public 5G networks, there is also a need to enable users in the SNPNs to be able to fully utilize the services provided by the 5G public networks, such as those provided by Internet Protocol Multimedia Systems (IMS) networks.

One way to facilitate this capability is to allocate a profile for each user in the IMS domain. Then, for each user in the SNPN, provision the requisite IMS credentials in the user's device (e.g., a User Equipment (UE)), and setup a subscription for the use in the Home Subscriber Server (HSS). However, such a solution would require each user's device to contain multiple Universal Subscriber Identity Modules (USIMs). Not only would this make a UE more costly to manufacture, but it would also complicate the handling of user identities. Particularly, every NPN user would have multiple identities—one for the NPN, and the other for the IMS network. And with multiple identities, provisioning the IMS credentials for each user would also be further complicated.

SUMMARY

In a first aspect, the disclosure provides a method of acquiring User Equipment (UE) configuration/subscription data over an access/core network. The method is implemented by a UE and comprises the steps of establishing a first Protocol Data Unit (PDU) session with a pre-defined Data Network Name (DNN) for remote provisioning, initiating an onboarding procedure over the first PDU session using remote provisioning information that enables the UE to access a remote provisioning system in the pre-defined DNN, receiving, from the remote provisioning system, the UE configuration/subscription data, wherein the UE configuration/subscription data comprises Internet Protocol Multimedia Subsystem (IMS) subscription data for an IMS network associated with a Non-Public Network (NPN), and responsive to determining that a connection to the IMS network associated with the NPN is required, establishing a second PDU session with the IMS network using the IMS subscription data. The pre-defined DNN may, in one embodiment, be a dedicated DNN for remote provisioning.

In a second aspect, the disclosure provides a UE comprising communications circuitry and processing circuitry operatively connected to the communications circuitry. The communications circuitry is configured to communicate with one or more network nodes. The processing circuitry is configured to establish a first Protocol Data Unit (PDU) session with a pre-defined Data Network Name (DNN) for remote provisioning, initiate an onboarding procedure over the first PDU session using remote provisioning information that enables the UE to access a remote provisioning system in the pre-defined DNN, receive the UE configuration/subscription data from the remote provisioning system, wherein the UE configuration/subscription data comprises Internet Protocol Multimedia Subsystem (IMS) subscription data for an IMS network associated with a Non-Public Network (NPN), and responsive to determining that a connection to the IMS network associated with the NPN is required, establish a second PDU session with the IMS network using the IMS subscription data.

In a third aspect, the disclosure provides a non-transitory computer-readable medium storing a computer program thereon. In this aspect, the computer program comprises instructions that, when executed by processing circuitry of a UE, causes the UE to establish a first Protocol Data Unit (PDU) session with a pre-defined Data Network Name (DNN) for remote provisioning, initiate an onboarding procedure over the first PDU session using remote provisioning information that enables the UE to access a remote provisioning system in the pre-defined DNN, receive the UE configuration/subscription data from the remote provisioning system, wherein the UE configuration/subscription data comprises Internet Protocol Multimedia Subsystem (IMS) subscription data for an IMS network associated with a Non-Public Network (NPN), and responsive to determining that a connection to the IMS network associated with the NPN is required, establish a second PDU session with the IMS network using the IMS subscription data.

In a fourth aspect, the present disclosure provides a computer program comprising executable instructions that, when executed by a by processing circuitry of a UE, causes the UE to establish a first Protocol Data Unit (PDU) session with a pre-defined Data Network Name (DNN) for remote provisioning, initiate a an onboarding procedure over the first PDU session using remote provisioning information that enables the UE to access a remote provisioning system in the pre-defined DNN, receive the UE configuration/subscription data from the remote provisioning system, wherein the UE configuration/subscription data comprises Internet Protocol Multimedia Subsystem (IMS) subscription data for an IMS network associated with a Non-Public Network (NPN), and responsive to determining that a connection to the IMS network associated with the NPN is required, establish a second PDU session with the IMS network using the IMS subscription data.

In a fifth aspect, the disclosure provides a carrier containing a computer program according to the nineteenth aspect, wherein the carrier is one of an electronic signal, optical signal, radio signal, or computer readable storage medium.

In a sixth aspect, the disclosure provides a method performed by a Session Management Function (SMF) node and comprises the steps of receiving, from a User Equipment (UE) in a Non Public Network (NPN) via an Access and Mobility Management (AMF) node, a session establishment request message requesting to establish a Protocol Data Unit (PDU) session for the UE to a Data Network Name (DNN), wherein the DNN comprises one of a pre-defined DNN used for remotely provisioning the UE, and an internet DNN provided by the Access and Mobility Management Function (AMF), obtaining, for the UE, remote provisioning information associated with the NPN, wherein the remote provisioning information is used by the UE to initiate an onboarding procedure that enables the UE to access the remote provisioning system, and obtaining information associated with the one of the pre-defined DNN and the internet DNN. Then, responsive to obtaining a packet filter, the method comprises selecting and configuring a UPF for the PDU session based on the DNN and the packet filter and sending a session establishment accept message comprising the remote provisioning information used by the UE to initiate the onboarding procedure.

In a seventh aspect, the disclosure provides a network node configured to operate as a Session Management Function (SMF). The network node comprises communications circuitry configured to communicate with one or more network nodes and processing circuitry operatively connected to the communications circuitry. Additionally, the processing circuitry is configured to receive, from a User Equipment (UE) in a Non Public Network (NPN) via an Access and Mobility Management (AMF) node, a session establishment request message requesting to establish a Protocol Data Unit (PDU) session for the UE to a Data Network Name (DNN), wherein the DNN comprises one of a pre-defined DNN used for remotely provisioning the UE, and an internet DNN provided by an Access and Mobility Management Function (AMF), obtain, for the UE, remote provisioning information associated with the NPN, wherein the remote provisioning information is used by the UE to initiate an onboarding procedure that enables the UE to access the remote provisioning system, and obtain information associated with the one of the pre-defined DNN and the internet DNN. Then, responsive to obtaining a packet filter, the processing circuitry selects and configures a UPF for the PDU session based on the DNN and the packet filter, and sends a session establishment accept message comprising the remote provisioning information used by the UE to initiate the onboarding procedure.

In an eighth aspect, the present disclosure provides a non-transitory computer-readable medium storing a computer program thereon. The computer program comprises instructions that, when executed by processing circuitry of a Session Management Function (SMF) node, causes the SMF to receive, from a User Equipment (UE) in a Non Public Network (NPN) via an Access and Mobility Management (AMF) node, a session establishment request message requesting to establish a Protocol Data Unit (PDU) session for the UE to a Data Network Name (DNN), wherein the DNN comprises one of a pre-defined DNN used for remotely provisioning the UE, and an internet DNN provided by an Access and Mobility Management Function (AMF), obtain, for the UE, remote provisioning information associated with the NPN, wherein the remote provisioning information is used by the UE to initiate an onboarding procedure that enables the UE to access the remote provisioning system, and obtain information associated with the one of the pre-defined DNN and the internet DNN. Then, responsive to obtaining a packet filter, the processing circuitry selects and configures a UPF for the PDU session based on the DNN and the packet filter and sends a session establishment accept message comprising the remote provisioning information used by the UE to initiate the onboarding procedure.

In a ninth aspect, the present disclosure provides a computer program comprising executable instructions that, when executed by a by processing circuitry of a Session Management Function (SMF) node, causes the SMF to receive, from a User Equipment (UE) in a Non Public Network (NPN) via an Access and Mobility Management (AMF) node, a session establishment request message requesting to establish a Protocol Data Unit (PDU) session for the UE to a Data Network Name (DNN), wherein the DNN comprises one of a pre-defined DNN used for remotely provisioning the UE, and an internet DNN provided by an Access and Mobility Management Function (AMF), obtain, for the UE, remote provisioning information associated with the NPN, wherein the remote provisioning information is used by the UE to initiate an onboarding procedure that enables the UE to access the remote provisioning system, and obtain information associated with the one of the pre-defined DNN and the internet DNN. Then, responsive to obtaining a packet filter, the instructions cause the SMF to select and configure a UPF for the PDU session based on the DNN and the packet filter and send a session establishment accept message comprising the remote provisioning information used by the UE to initiate the onboarding procedure.

In a tenth aspect, the disclosure provides a carrier containing a computer program according to the twenty-fourth aspect, wherein the carrier is one of an electronic signal, optical signal, radio signal, or computer readable storage medium.

In an eleventh aspect, the disclosure provides a method performed by an Access and Mobility Management Function (AMF) node. In this aspect, the method comprises the steps of receiving, from a User Equipment (UE) in a Non Public Network (NPN), a session establishment request message requesting to establish a Protocol Data Unit (PDU) session for the UE to a Data Network Name (DNN), wherein the session establishment request message includes one of a pre-defined DNN and a pre-defined session establishment request type used for remotely provisioning the UE in an onboarding procedure, selecting a Session Management Function (SMF) node, and sending a session establishment create request message to the selected SMF.

In a twelfth aspect, the disclosure provides a network node configured to operate as an Access and Mobility Management Function (AMF). In this aspect, the network node comprises communications circuitry configured to communicate with one or more network nodes, and processing circuitry operatively connected to the communications circuitry. The processing circuitry in this aspect is configured to receive, from a User Equipment (UE) in a Non Public Network (NPN), a session establishment request message requesting to establish a Protocol Data Unit (PDU) session for the UE to a Data Network Name (DNN), wherein the session establishment request message includes one of a pre-defined DNN and a pre-defined session establishment request type used for remotely provisioning the UE in an onboarding procedure, select a Session Management Function (SMF) node, and then send a session establishment create request message to the selected SMF.

In a thirteenth aspect, the disclosure provides a non-transitory computer-readable medium storing a computer program thereon. The computer program comprises instructions that, when executed by processing circuitry of an Access and Mobility Management Function (AMF) node, causes the AMF to receive, from a User Equipment (UE) in a Non Public Network (NPN), a session establishment request message requesting to establish a Protocol Data Unit (PDU) session for the UE to a Data Network Name (DNN), wherein the session establishment request message includes one of a pre-defined DNN and a pre-defined session establishment request type used for remotely provisioning the UE in an onboarding procedure, select a Session Management Function (SMF) node, and then send a session establishment create request message to the selected SMF.

In a fourteenth aspect, the disclosure provides a computer program comprising executable instructions that, when executed by a by processing circuitry of an Access and Mobility Management Function (AMF) node, causes the AMF receive, from a User Equipment (UE) in a Non Public Network (NPN), a session establishment request message requesting to establish a Protocol Data Unit (PDU) session for the UE to a Data Network Name (DNN), wherein the session establishment request message includes one of a pre-defined DNN and a pre-defined session establishment request type used for remotely provisioning the UE in an onboarding procedure, select a Session Management Function (SMF) node, and then send a session establishment create request message to the selected SMF.

In a fifteenth aspect, the disclosure provides a carrier containing a computer program according to the twenty-ninth aspect, wherein the carrier is one of an electronic signal, optical signal, radio signal, or computer readable storage medium.

In a sixteenth aspect, the disclosure provides a method for providing User Equipment (UE) subscription data associated with a Non-Public Network (NPN). In this embodiment, the method implemented by a Unified Data Management (UDM) node and comprises receiving a request for session subscription information for the UE, wherein the request includes a UE identity, and sending, in reply to the request, a response comprising remote provisioning information used by the UE to initiate an onboarding procedure to enable the UE to remotely provision a subscription for a 5GS network and an Internet Protocol Multi-Media Subsystem (IMS) network.

In a seventeenth aspect, the disclosure provides a network node configured to operate as a Unified Data Management (UDM) function. The network node comprises communications circuitry configured to communicate with one or more network nodes, and processing circuitry operatively connected to the communications circuitry. According to this aspect, the processing circuitry is configured to receive a request for session subscription information for the UE, wherein the request includes a UE identity, and send, in reply to the request, a response comprising remote provisioning information used by the UE to initiate an onboarding procedure to enable the UE to remotely provision a subscription for a 5GS network and an Internet Protocol Multi-Media Subsystem (IMS) network.

In an eighteenth aspect, the disclosure provides a non-transitory computer-readable medium storing a computer program thereon. In this aspect, the computer program comprises instructions that, when executed by processing circuitry of a Unified Data Management (UDM) node, causes the UDM to receive a request for session subscription information for the UE, wherein the request includes a UE identity, and send, in reply to the request, a response comprising remote provisioning information used by the UE to initiate an onboarding procedure to enable the UE to remotely provision a subscription for a 5GS network and an Internet Protocol Multi-Media Subsystem (IMS) network.

In a nineteenth aspect, the disclosure provides a computer program comprising executable instructions that, when executed by processing circuitry of a Unified Data Management (UDM) node, causes the UDM to receive a request for session subscription information for the UE, wherein the request includes a UE identity, and send, in reply to the request, a response comprising remote provisioning information used by the UE to initiate an onboarding procedure to enable the UE to remotely provision a subscription for a 5GS network and an Internet Protocol Multi-Media Subsystem (IMS) network.

In a twentieth aspect, the disclosure provides a carrier containing a computer program according to the thirty-third aspect, wherein the carrier is one of an electronic signal, optical signal, radio signal, or computer readable storage medium.

DETAILED DESCRIPTION

Figure 1:
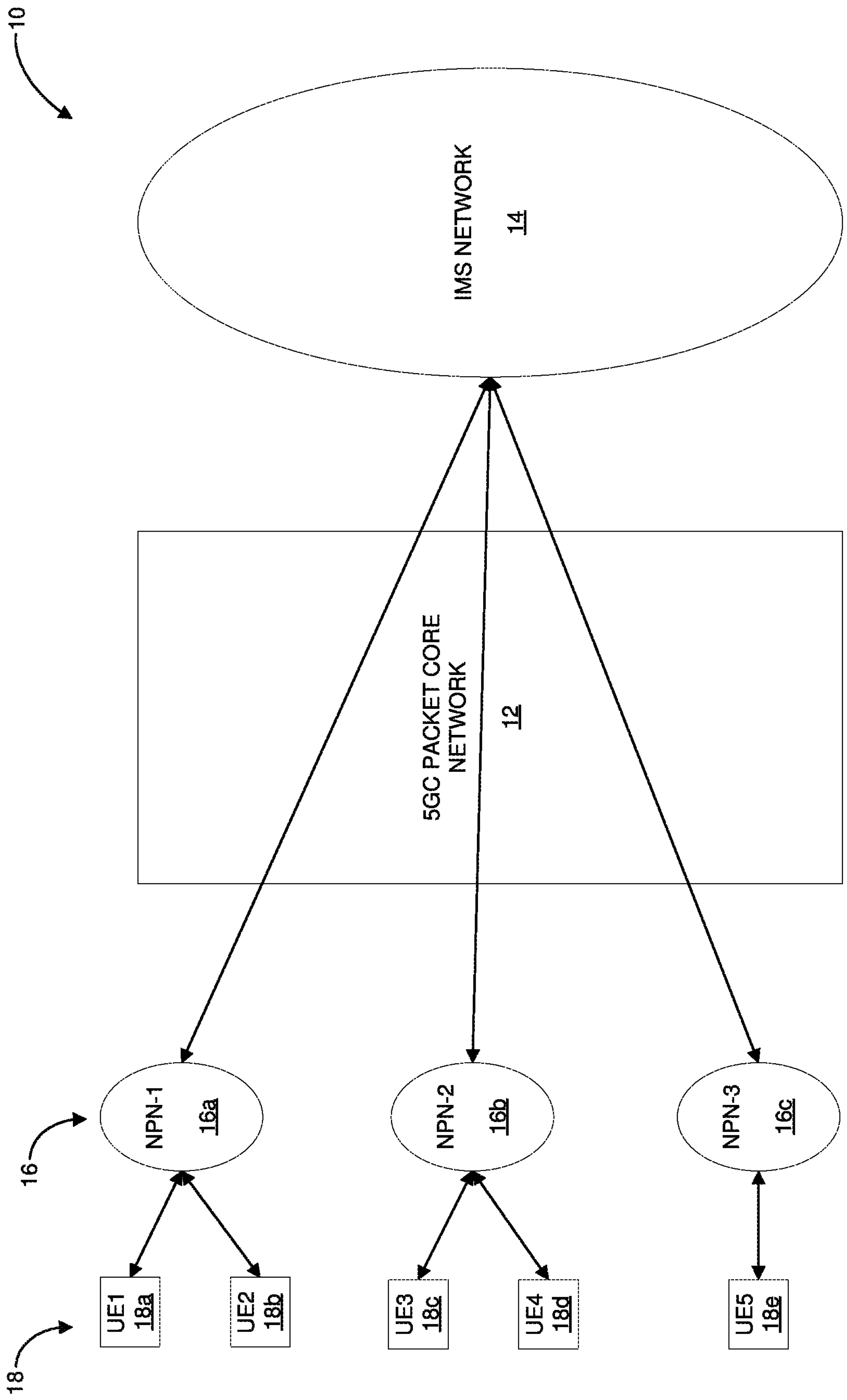
FIG. 1 is a functional block diagram illustrating, conceptually, how an IMS network operates with multiple Non-Public Networks (NPNs) according to one embodiment of the present disclosure.

Referring now to the drawings, an exemplary embodiment of the present disclosure will be described in the context of the 5G standard by the Third Generation Partnership Project (3GPP) communication network. Those skilled in the art will appreciate that the methods and apparatus herein described are not limited to use in 5G networks but may also be used in communication networks operating according to other standards that use a service-based architecture and provide restart notifications.

Embodiments of the present disclosure enable UEs connected to an SNPN to receive IMS and emergency services by using eSIM to onboard the IMS credentials needed by the UE for those services. More particularly, the present disclosure describes the support required in the UE for performing eSIM remote provisioning (e.g., based on GSMA specifications "GSMA: "RSP Technical Specification Version 2.2.1 18 Dec. 2018" and "GSMA: "Remote Provisioning Architecture for embedded UICC Technical Specification Version 4.0 25 Feb. 2019"), the requirements for the SNPN 5GC, the subscription profile of SNPN UEs in the 5GC, and the IMS system.

FIG. 1 is a functional block diagram illustrating a communications system 10, and conceptually shows how an IMS network would work with a Non-Public Network (NPN) according to one embodiment of the present disclosure. As seen in FIG. 1, system 10 comprises a 5GC Packet Core Non-Public Network (NPN) 12 communicatively interconnecting an IMS network 14 with a plurality of NPN access networks 16*a*, 16*b*, 16*c* (collectively, NPN access networks 16). A plurality of UEs 18*a*, 18*b*, 18*c*, 18*d*, 18*e* (collectively, UE 18) are connected to corresponding NPN access networks 16, and access IMS services provided by IMS network 14 via the NPN access networks 16 and NPN 12.

Figure 2:
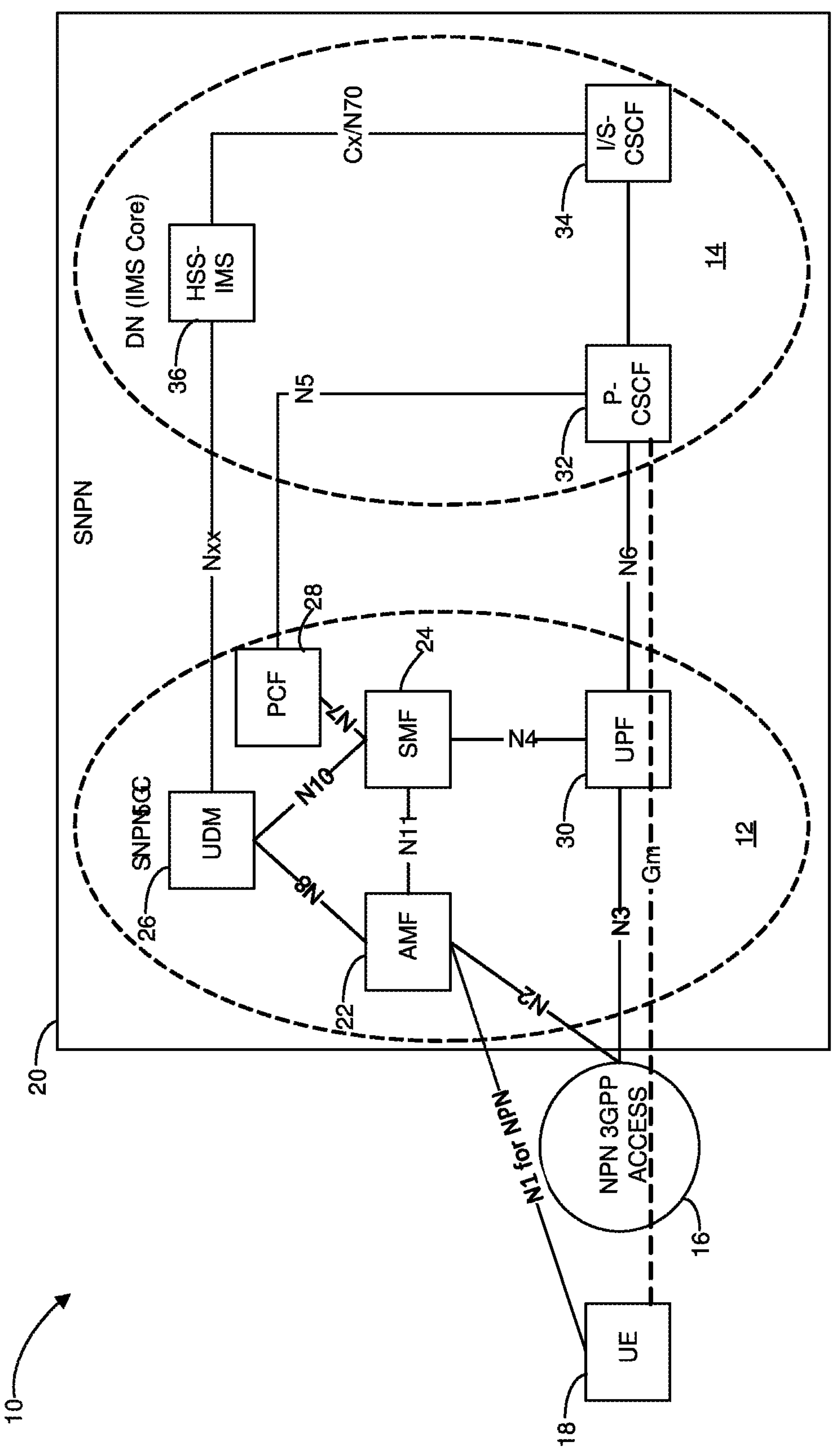
FIG. 2 is a functional block diagram illustrating an architecture for providing IMS services to a user of a NPN according to one embodiment of the present disclosure.

FIG. 2 is a functional block diagram illustrating a reference architecture for providing IMS services to a user of a NPN according to one embodiment of the present disclosure. As seen in FIG. 2, system 10 comprises a Standalone NPN (SNPN 20) comprising core NPN 12 and IMS network 14. Additionally, as previously described, UE 18 accesses the services provided by the core NPN 12 and the IMS network 14 via the NPN access network 16.

The core NPN 12 employs a service-based architecture according to the 5G standard by the Third Generation Partnership Project (3GPP). As seen in FIG. 2, core NPN 12 comprises a number of network functions (NFs) such as an Access and Mobility Management Function (AMF) 22, a Session Management Function (SMF) 24, a Unified Data Management (UDM) function 26, a Policy Control Function (PCF) 28, and a User Plane Function (30). Those of ordinary skill in the art will appreciate that core NPN 12 may have other NFs not specifically shown here, such as an Authentication Server Function, a Network Exposure Function, a Network Slice Selection Function, a Network Repository Function, an Application Function (which may be located in the core NPN 12 or be external to the core NPN 12), a Unified Data Repository, a Network Data Analytics Function, and a Charging Function.

The NFs shown in FIG. 2 comprise logical entities that reside in one or more core network nodes, which may be implemented by one or more processors, hardware, firmware, or a combination thereof. The NFs may reside in a single core network node or may be distributed among two or more core network nodes. Further, the core NPN 12 may include multiple instances of the NFs.

IMS network 14 also comprises a number of NFs, such as a Proxy-Call Session Control Function (P-CSCF) 32, an Interrogating/Serving Call Session Control Function (I/S-CSCF) 34, and a Home Subscriber Server (HSS)-Internet Protocol Multimedia Session (IMS) Function 36.

The P-CSCF 32 is the first contact point for users of IMS network 14, and functions as a proxy server for UEs 18. Generally, all Session Initiation Protocol (SIP) signaling traffic to and from the UEs 18 pass through the P-CSCF 32. The I/S-CSCF 34 is a node that integrates the functions of both an I-CSCF and an S-CSCF, and is the contact point within IMS network 14 for all connections destined to a UE 18 on IMS network 14. For example, during registration, I/S-CSCF 34 interrogates the HSS to determine where to route the request for registration. I/S-CSCF 34 also provides session set-up, session tear-down, session control and routing functions, and in some situations, may also generate billing records and invoke Application Servers (ASs) based on information received from the HSS. The HSS 36 is a database configured to support the other functions in IMS network 14 that handle user traffic.

According to the present disclosure, a node in the IMS network 14 or the remote provisioning manager/eSIM manager sends commands to the UDM 26 in one embodiment to update a UE profile at the UDM based on IMS subscription information, and in other embodiments, to create a subscription for a UE 18 for the NPN access network 16 as well as the core NPN 12.

The architecture illustrated in FIG. 2 assumes a one-to-one relationship between the core NPN 12 and IMS network 14. Thus, in this embodiment, IMS network 14 is part of the SNPN 20. However, those of ordinary skill in the art should readily appreciate that the present embodiments are not so limited and that other deployment options are also possible. In some embodiments, for example, IMS network 14 is owned and operated by a third-party, and as such, comprises an entity that is independent of SNPN 20.

In the embodiment of FIG. 2, IMS network 14 is accessed over an N6 reference point as a Data Network offered by SNPN 20. A Gm reference point extends between UE 18 and P-CSCF 32, and is managed as user plane traffic via UPF 30. Additionally, embodiments of the present disclosure require inter-network connectivity between the P-CSCF 32 and the HSS-IMS 36 in IM network 14 with the PCF 28 and UDM 26 in core NPN 12, respectively. Thus, to gain this connectivity, the present embodiments provide an N5 interface between the P-CSCF 32 and PCF 28, and an Nxx interface between the UDM 26 and the HSS-IMS 36.

As stated above, IMS network 14 may be owned/operated by a third-party (e.g. a PLMN operator) that is independent of the operator of the core NPN 12. Thus, in some cases, the interconnectivity provided by the N6, N5 and Nxx reference points implies the use of inter-operator interfaces. In these cases, however, the present embodiments will be able to support additional security requirements over these interfaces.

Additionally, embodiments of the present disclosure can be implemented in cases where IMS network 14 supports Service Based Interfaces (SBI) or legacy interfaces.

The present embodiments also require that the core NPN 12 enable some relevant functionality to support IMS services, as defined in section 5.16.3.1 of 3GPP TS 23.501. This includes support for:

- Indicating toward the UE 18 whether IMS voice over PS session is supported;
- Transporting P-CSCF address(es) to UE (the P-CSCF IP address(es) may be locally configured in the SMF 24 of core NPN 12, or dynamically discovered by SMF 24 via an NRF (not shown)); and
- Support of a P-CSCF restoration procedure.
- However, according to the present disclosure, not all the capabilities listed in in section 5.16.3.1 of TS 23.501 are required. For example, support for Terminating Access Domain Selection (TADS) is not required as IMS voice calls to/from users of SNPN 20 are expected to always be managed via New Radio (NR). Similarly, domain selection for UE-originating sessions is set in UEs 18 connected to SNPN 20 to always generate voice calls over IMS.

Onboarding and Provisioning of IMS Subscription/Access Related Information

Figure 3:
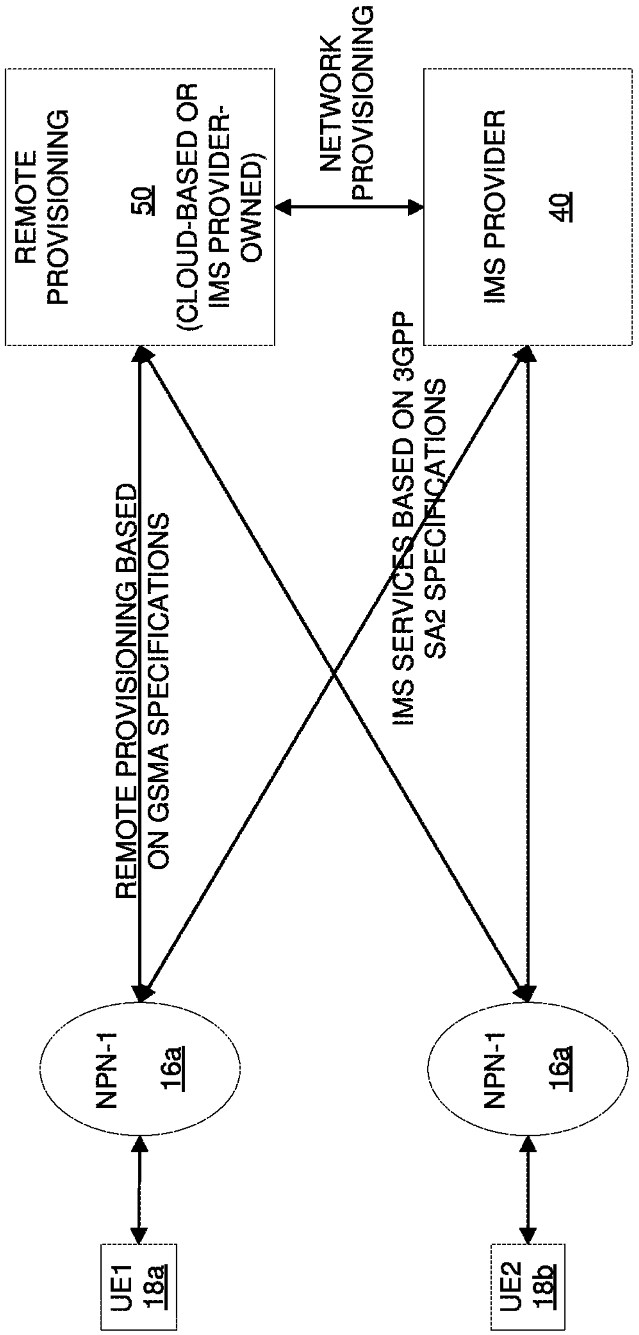
FIG. 3 is a functional block diagram illustrating an architecture for remotely provisioning UEs with IMS credentials according to one embodiment of the present disclosure.

FIG. 3 is a functional block diagram illustrating a high-level architecture for remotely provisioning UEs 18 with IMS credentials according to one embodiment of the present disclosure.

More specifically, to enable the use of IMS voice and emergency services by UEs 18 connected to SNPN 20, the present disclosure remotely provisions the UEs 18 for the needed IMS access related information, in one embodiment, or both access network related information and IMS network related information in another embodiment, based on the specifications detailed in GSMA: "RSP Technical Specification Version 2.2.1" and "GSMA: "Remote Provisioning Architecture for embedded UICC Technical Specification." This process is illustrated in FIG. 3.

According to the present embodiments, multiple options are possible to effect remote provisioning. The particular option, however, depends on the deployment option chosen by the operator of the SNPN 20. By way of example only, some of the options that are possible according to the present embodiments are:

- Option 1: If SNPN 20 owns and operates IMS network 14, the SNPN 20 can use a cloud-based remote provisioning system 50 for the remote provisioning of eSIMs;
- Option 2: If SNPN 20 uses the services from an independent IMS provider (i.e., a third-party owner of IMS network 14), however, then SNPN 20 can use the remote provisioning of eSIMs of either the cloud-based remote provisioning system 50 or the remote provisioning system 40 owned by the third-party IMS provider.

Those skilled in the art should appreciate, however, that these options may require some necessary agreements to be in place between the operators of SPNP 20 and the other entities (e.g., the third-party IMS provider) in accordance with the above-identified GSMA specifications.

According to the present disclosure, UE subscription-related information for remote provisioning is provisioned in UDM 26 by the operator of the core NPN 12. Such data for the remote provisioning of an eSIM for a UE 18 includes:

- UE authorization, referred to as triggering enabling information, to authorize the UE for remote provisioning; and
- UE transparent information required by the UE to interact with the remote provisioning system. The information that is needed by the UE depends on which of the options above are selected, as well as the agreements, as previously described.

After successful completion of the onboarding process, the core NPN 12 subscription information is updated according to the present embodiments to include the IMS Data Network Name (DNN), and triggering disabling information.

It should be noted that, as part of the onboarding process, the selected IMS provider is provisioned with the requisite IMS subscription related information, per subscriber, depending on the agreement in place between the core NPN 12 and the IMS provider. Additionally, an IMS network 14 serving multiple SNPNs 20 will be pre-configured with the information it needs to interact with each SNPN 20 it services. Once the requisite IMS access related information is downloaded to the UE 18, it can be used for IMS registration and to acquire desired IMS services.

IMS Support for Multi-SNPNs (Multi-Tenancy) IMS Support for Multi-SNPNs (Multi-Tenancy)

According to the present embodiments, in cases where the operator of SNPN 20 owns and operates the IMS network 14 providing the IMS services to the UE 18, then there are no additional impacts beyond what has already been previously described. However, in situations where the operator of the IMS network 14 is a different entity, which can potentially interwork with multiple SNPNs 20, there are additional requirements.

More specifically, a single IMS network 14 supporting multiple SNPNs 20 (multi-tenancy) needs to be able to identify each SNPN 20 for multiple reasons, including:

- To interwork with appropriate network functions belonging to the corresponding core NPN 12 for signaling purposes. The NFs at the corresponding SNPN 20 can be pre-configured for each SNPN 20 at the IMS network 14;
- To statistically distinguish the collected data for different SNPNs 20; and
- To charge the SNPNs 20.

Additionally, different strategies may be adopted to support multiple SNPNs 20. In one strategy, for example, the operator of the IMS network 14 can use common IMS NF instances (e.g. P-CSCF or HSS) for all IMS users or deploy separate IMS NF instances for each SNPN 20. In other strategies, the identification of the corresponding SNPN 20 for these purposes can be based on the home network domain and the IP Multimedia Private Identity/IP Multimedia Public Identity (IMPI/IMPU) identifiers provided by the UE during the IMS registration procedure. This enables HSS to identify the SNPN 20.

Further, the P-CSCF 32 is able to acquire the Public Land Mobile Network Identifier (PLMN-ID) and Network Interface Device (NID) of the SNPN 20 during the IMS registration procedure.

Roaming

For roaming between an SNPN 20 and a public PLMN supported by a roaming agreement, there is no additional functionality required. Existing procedures are applicable as is, considering that the interface between P-CSCF 32 and PCF 28 may be inter-operator, as previously mentioned. However, support for roaming is subject to an interworking agreement between roaming partners.

Remote Provisioning

Figure 4:
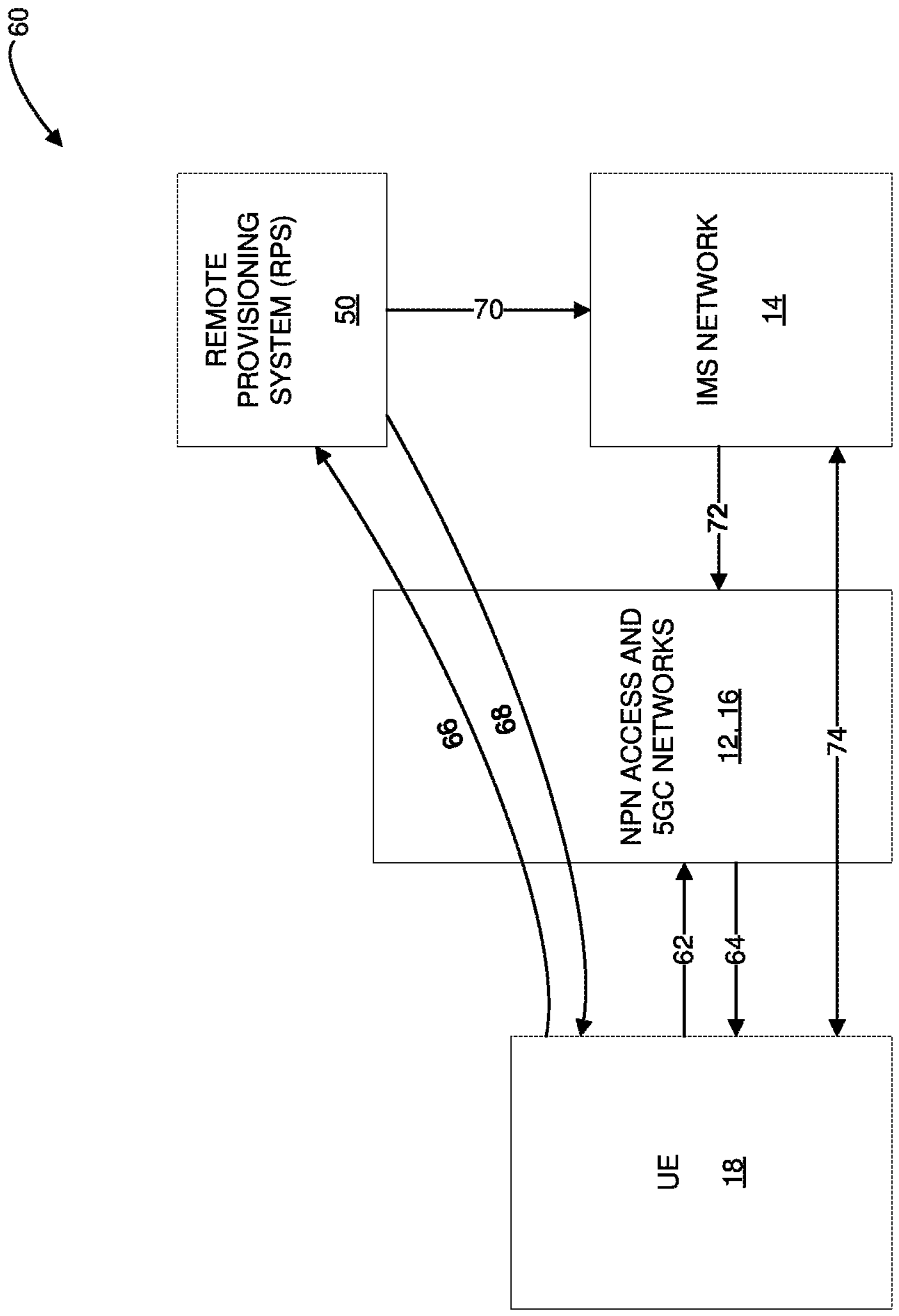
FIG. 4 is a functional block diagram illustrating a method for providing IMS services to a UE according to embodiments of the present disclosure.

FIG. 4 is a functional block diagram illustrating a method 60 for providing IMS services to a UE 18 according to embodiments of the present disclosure. Particularly, as seen in FIG. 4, a UE 18 communicatively connects to a remote provisioning system 50 and/or IMS network 14 via the NPN access network 16 and core NPN 12. Those of ordinary skill in the art will readily appreciate that, for ease of discussion only, the NPN access network 16 and core NPN 12 are illustrated as a single box 12, 16. Once connected, the UE 18 can establishes a PDU connection with the IMS network 14 and receives IMS services.

In more detail, a UE 18 wishing to access IMS services sends a PDU session establishment request message to the core NPN 12 (line 62) and receives, in return, a PDU session establishment accept message (line 64). The PDU session establishment accept message includes the remote provisioning information needed by the UE 18 to access a remote provisioning system (e.g., remote provisioning system 50 or a system provided by IMS network 14). The UE 18 then initiates a remote provisioning procedure at the remote provisioning system 50 and passes the remote provisioning information it received to the remote provisioning system 50 (line 66). In return, the UE 18 receives credentials (e.g., eSIM credentials) with which it can access IMS services (line 68). The remote provisioning system 50 then creates a subscription with the HSS 36 (line 70), and a node in the IMS network 14 (e.g., the HSS 36 or some other node), in turn, updates the UDM 26 (directly or via Network Exposure Function (NEF) in the core NPN 12 to add the IMS services for the UE (line 72). Once provisioned, the UE 18 can establish a session with the IMS network 14 and access the desired IMS services.

The present disclosure provides at least two methods for enabling UEs 18 to access IMS services. In a first method, seen in the signaling diagram 80 of FIG. 5, the UE 18 is assumed to have acquired the information needed to access the NPN access and Core network 16 (e.g., real SUPI, security credentials, etc.). With this method, the credentials provided to the UE 18 as a result of the remote provisioning procedure are used only for IMS purposes. However, in the second method seen in the signaling diagram 90 of FIG. 6, the credentials provided to the UE 18 are utilized by the UE 18 to access both the NPN access/core network 16 and for the IMS network 14.

Figure 5:
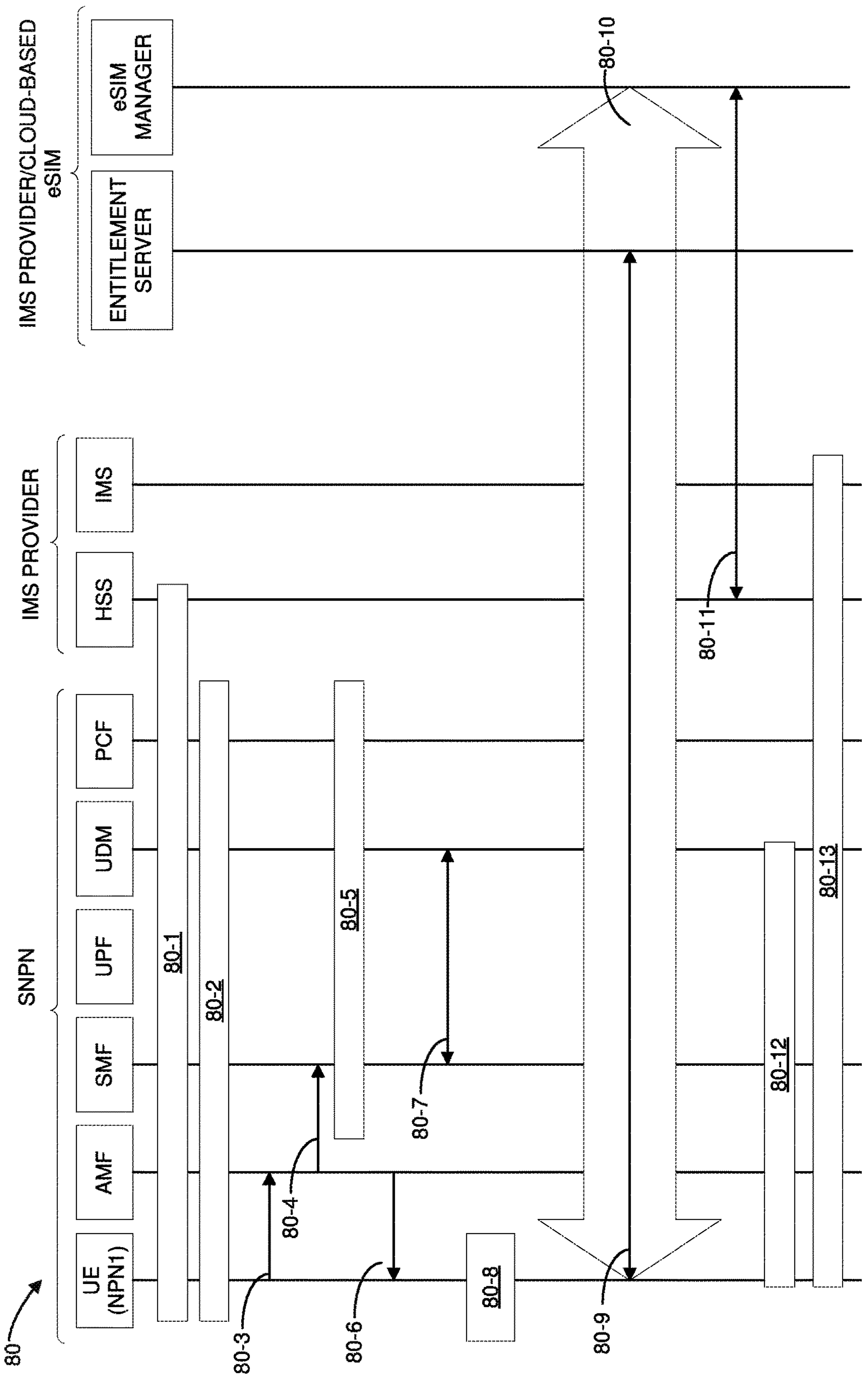
FIG. 5 is a signaling diagram illustrating a call flow for providing IMS services to a UE according to one embodiment of the present disclosure.

Turning first to the method shown in FIG. 5, it is assumed that the UE 18 has already acquired the information it needs to access the NPN access network 16 the onboarding process (box 80-1). In particular, in this first method, it is assumed that the UE 18 has already been assigned a unique Subscription Permanent Identifier (SUPI) for the NPN access network 16 and the core NPN 12.

In box 80-2, UE 18 performs a 5GC registration in accordance with the procedures specified in 3GPP TS 23.502 V16.4.0: "Procedures for the 5G System (5GS); Stage 2" (Release 16) dated March 2020.

In line 80-3, UE 18 initiates a Packet Data Network (PDN) connection for a DNN as specified by the procedures in 3GPP TS 23.502.

In line 80-4, AMF 22 selects an SMF 24, and sends a Nsf_PDUSession_CreateSMContext Request message to the selected SMF 24.

In box 80-5, upon receiving the message from the AMF 22, SMF 24 fetches the session subscription related information for the UE 18 from UDM 26. According to the present embodiments, the session subscription related information received from the UDM 26 includes remote provisioning information and eSIM enabling triggering information. The remote provisioning information is sent by UDM 26 to SMF 24 in the UDM session subscription information as transparent information to be transported to UE 18 in the PDU session establishment accept response message. The eSIM enabling triggering information is sent by UDM 26 to allow SMF 24 to determine whether the subscription requires eSIM remote provisioning. If, based on the eSIM enabling triggering information, SMF 24 determines that remote provisioning is required for the subscription SMF 24 includes the remote provisioning information in the PDU session establishment accept response message sent to UE 18.

According to the present disclosure, the remote provisioning information (e.g., eSIM remote provisioning related information) typically includes all the information UE 18 needs to initiate a remote provisioning procedure. However, the particular information included in the remote provisioning procedure can vary depending on factors such as the selected SNPN 20 deployment option, the UE vendor, the remote provisioning service provider, and the IMS provider. In one embodiment, however, the remote provisioning information returned to UE 18 in the PDU session establishment accept response message includes, but is not limited to, NPN subscription information for the UE, authentication credentials for authenticating the UE with the remote provisioning system, enhanced Subscriber Identity Module (eSIM) entitlement server information such as a link to the eSIM entitlement server, and one or more eSIM Information Elements (IE).

In line 80-6, the PDU Session Establishment Accept Response, which includes the remote provisioning related information required for UE 18 to initiate the remote provisioning procedure, is sent to UE 18.

In line 80-7, SMF 24 registers the UE context in UDM 26.

In box 80-8, the UE 18 determines that it must initiate a remote provisioning procedure responsive to receiving the remote provisioning information in the PDU Session Establishment Accept Response message. Thus, the receipt of the remote provisioning information in the PDU Session Establishment Accept Response message triggers UE 18 to initiate the remote provisioning procedure.

In line 80-9, UE 18 initiates interaction with the remote provisioning system 50 to update its subscription at the HSS 36. To initiate such interaction, the UE 18, in one embodiment, sends an Initiate Provisioning Request to an entitlement server associated with the IMS provider. Additionally, the UE 18 includes its SUPI in the request, which as stated above, is unique and assigned to the UE 18, and is for both the NPN access network 16 and the core NPN 12.

In box 80-10, UE 18 downloads eSIM data in accordance with the previously identified GMSA: "RSP Technical Specification" and "GSMA: "Remote Provisioning Architecture for embedded UICC Technical Specification Version."

In line 80-11, an eSIM manager associated with the IMS provider provisions the HSS 36 with the requisite provisioning information so that it can update the UE subscription. In this embodiment, the provisioning information includes the unique SUPI assigned to UE 18.

In box 80-12, a node in the IMS network 14 sends a message to the UDM 26 via the Nxx interface, or a NEF, to update the UDM subscription for the UE 18. Upon receiving the message, the UDM 26 updates the UDM subscription by adding the IMS DNN to the UE profile and by disabling the triggering information.

At this point, the remote provisioning procedure is complete. Thus, in box 80-12, UE 18 can initiate an IMS PDN connection to establish an IMS PDU session.

In box 80-13, UE 18 uses the eSIM credentials it received to initiate IMS procedures based on existing specifications 3GPP TS 23.228 V16.4.0 "IP Multimedia Subsystem (IMS); Stage 2 (Release 16)" dated March 2020.

Figure 6:
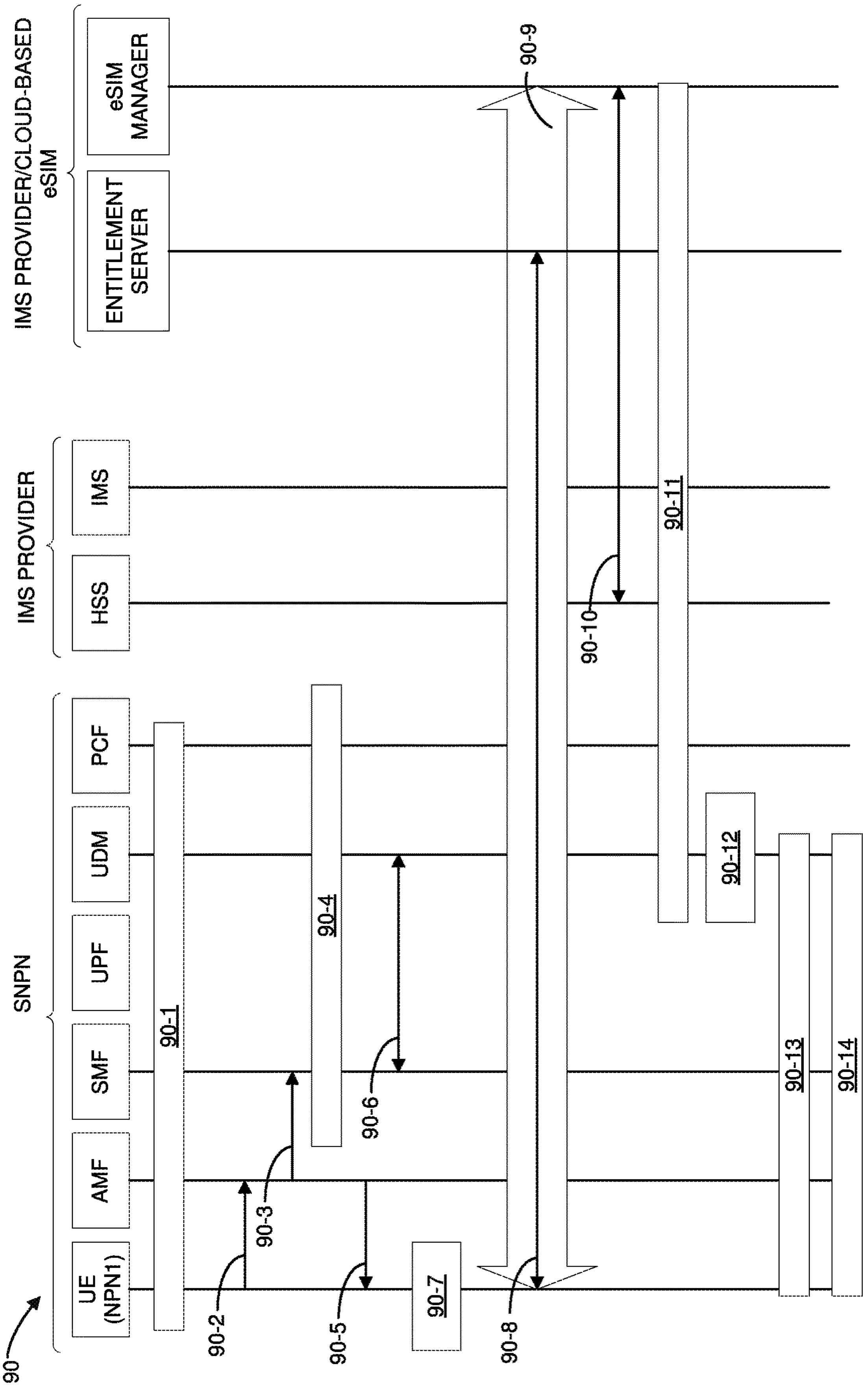
FIG. 6 is a signaling diagram illustrating a call flow for providing IMS services to a UE according to another embodiment of the present disclosure.

FIG. 6 illustrates the second method using signaling diagram 90. In this method, the credentials provided to UE 18 are utilized to access both the NPN access network 16 and for authentication and authorization in the IMS network 14. This differs from the first method seen in signaling diagram 80 of FIG. 5, in which the credentials provided to UE 18 are utilized only for IMS purposes.

More particularly, the first method illustrated in signaling diagram 80 of FIG. 5 assumes that UE 18 already has been assigned a unique SUPI. Thus, the UE 18 can already access the NPN access network 16 and core NPN 12 and does not require credentials to obtain a SUPI for those networks. It requires the credentials only for IMS purposes, and thus, the processes described and performed in the embodiment of FIG. 5 utilize this "actual" SUPI assigned to the UE 18 to provide those credentials.

The second method illustrated in signaling diagram 90 of FIG. 6, however, covers situations where the UE 18 has not yet been assigned a unique/real SUPI. Thus, as described in more detail below, the second method allows for the use of a "temporary" SUPI by UE 18. The use of the temporary SUPI by UE 18 allows for at least two things. First, it allows the UE 18 to be assigned an "actual" unique SUPI so it can register with the NPN access network 16 and core NPN 12 using the assigned SUPI. Second, it allows UE 18 to obtain the necessary information for initiating the remote provisioning procedure and to download the data that allows for the establishment of a connection with IMS network 14 to obtain the desired IMS services. Second, As seen in FIG. 6, signaling diagram 90 uses the same reference architecture as signaling diagram 80.

In box 90-1, UE 18 registers with the core NPN 12 in accordance with the procedures specified in 3GPP TS 23.502 V16.4.0: "Procedures for the 5G System (5GS); Stage 2" (Release 16) dated March 2020. In this embodiment, to accomplish such registration, UE 18 uses a well-known "temporary" SUPI. In some embodiments, SNPN 20 may have one or more such "temporary" or "default" SUPIs, and the UE 18 can use a selected one of those temporary SUPIs depending on its needs. In this embodiment, the "temporary" SUPI is also used by UE 18 during the remote provisioning process. As part of the registration procedure, the AMF may contact the UDM to retrieve from the UDM the subscription data. As the UE is using a temporary SUPI, the UDM may provide temporary subscription data that may comprise one allowed DNN that the UE is allowed to use when establishing a PDU session and that DNN is a default DNN or a DNN that allows the UE to establish a PDU session with a provisioning system only.

In line 90-2, UE 18 initiates a Packet Data Network (PDN) connection for a DNN as specified by the procedures in 3GPP TS 23.502, the UE may include the DNN for the provisioning system or may omit to include the DNN. If the UE has included the DNN, the AMF verifies if the DNN is compatible with the temporary subscription, if not, the AMF overrides with the DNN for remote provisioning.

In line 90-3, AMF 22 selects an SMF 24, and sends a Nsf_PDUSession_CreateSMContext Request message to the selected SMF 24. If the AMF had provided a DNN for remote provisioning for the temporary SUPI, and optionally an indication that the UE is using a temporary SUPI, the SMF may verify if the DNN is compatible with a configured DNN for remote provisioning if one is configured determines that the UE can only transmit traffic over the PDU session for provisioning and may provide as part of remote provisioning information, packet filters for uplink to the UE in the PDU session establishment accept message and may also provide an identification ?(IP address or similar) of the remote provisioning system server. Additionally, the SMF configures the User plane function (UPF) to only allow traffic between the UE and the remote provisioning system over the PDU session. If the SMF is not configured with the remote provisioning information it proceeds with step 4, In box 90-4, SMF 24 fetches the session subscription related information associated with the UE's 18 registered temporary SUPI. The session subscription related information includes eSIM remote provisioning information for the temporary SUPI, and is sent to the SMF 24 by UDM 26 as either transparent information to be transported to UE 18 as remote provisioning information in the PDU Session Establishment Accept response message. The eSIM remote provisioning related information can include any information needed or desired; however, it typically includes all the information needed by UE 18 to initiate the remote provisioning process. The transparent remote provisioning information may include the identification of the remote provisioning system. Such information can vary depending on SNPN chosen deployment option, the UE vendor, the remote provisioning service provider, and/or the IMS provider. However, in one embodiment, the eSIM remote provisioning information returned to UE 18 in the PDU session establishment accept response message includes, but is not limited to, enhanced Subscriber Identity Module (eSIM) entitlement server information such as a link to the eSIM entitlement server, and one or more eSIM Information Elements (IE). The SMF may also use all or part of the remote provisioning information or another indication to determine that the traffic over the PDU session must be limited to provisioning, the SMF may also provide a packet filter for the UE to only allow uplink traffic to the remote provisioning system as part of the PDU session accept message.

In line 90-5, the PDU Session Establishment Accept Response message, which includes the remote provisioning related information required for UE 18 to initiate the remote provisioning procedure, is sent to UE 18.

In line 90-6, SMF 24 may register the UE context in UDM 26, albeit it is based on temporary UE identity.

In box 90-7, UE 18 determines that it should initiate a remote provisioning procedure responsive to receiving the remote provisioning information in the PDU Session Establishment Accept Response message if it wants to receive services. That is, the receipt of the remote provisioning information in the PDU Session Establishment Accept Response message may trigger the UE 18 to initiate the remote provisioning procedure. Alternatively, the UE may trigger the procedure when it has uplink data to send (e.g., UE attempting to access any service/internet, etc.), triggering the remote provisioning procedure (automatically or manually by the user) if for example the UE determines that the UL packet filter if provisioned by the SMF does not match the uplink data (e.g., destination IP address does not match the destination IP address (remote provisioning/entitlement server) in the UL packet filter)

In line 90-8, UE 18 initiates interaction with the remote provisioning system 50 to update its subscription. To initiate such interaction, the UE 18, in one embodiment, sends an Initiate Provisioning Request to an entitlement server associated with the NPN. Additionally, the UE 18 includes its temporary SUPI in the request.

In box 90-9, UE 18 downloads eSIM data in accordance with the previously identified GMSA: "RSP Technical Specification" and "GSMA: "Remote Provisioning Architecture for embedded UICC Technical Specification Version." In this embodiment, the UE receives access subscription information and IMS subscription information.

In line 90-10, the eSIM manager (which may be the same as provisioning/entitlement server) associated with the NPN provisions the HSS 36 with the requisite provisioning information so that it can create the UE subscription. In this embodiment, the provisioning information includes the actual/real SUPI associated with the temporary SUPI and the credentials needed by the UE to obtain IMS services.

In box 90-11, the UDM 26 obtains, from a node in the IMS network 14 (including the eSIM provisioning system), directly or via NEF, real provisioning information that includes creation of an access related subscription associated with the actual/real SUPI of the UE and would enable the UE to perform a new registration with the real SUPI and be authenticated and establishment of PDU sessions to allowed DDNs. The UDM also obtains any relevant subscription data to allow the UE to establish a PDU session to IMS to access IMS services based on the real/actual SUPI, such as IMS DDN at a minimum.

At this point, the remote provisioning procedure is complete where both the UE and the UDM have obtained the required subscription data is based on the real SUPI. In box 90-12, UDM 26 creates the UE subscription. Particularly, UDM 26 creates a SUPI profile for UE 18, and allocates a default profile for that SUPI. This SUPI is unique to the UE 18 and will replace the temporary SUPI.

In box 90-13, prior to establishing the IMS session with the IMS provider, UE 18 de-registers from the core NPN 12 using the temporary SUPI.

In box 90-14, the UE 18 initiates a new registration with the core NPN 12 using the newly assigned SUPI and performs authentication The UE 18 can initiate an IMS PDN connection to establish an IMS PDU session and use the eSIM credentials to initiate IMS procedures based on existing specifications 3GPP TS 23.228 V16.4.0 "IP Multimedia Subsystem (IMS); Stage 2 (Release 16)" dated March 2020.

Thus, embodiments of the present disclosure provide a simple way for allowing NPN users to use IMS network with only minor changes to be made to impacted nodes. Further, the present embodiments accomplish these goals without requiring anything specific from NPNs, and without requiring the provisioning of IMS credentials in any NPN UE device.

Figure 7A:
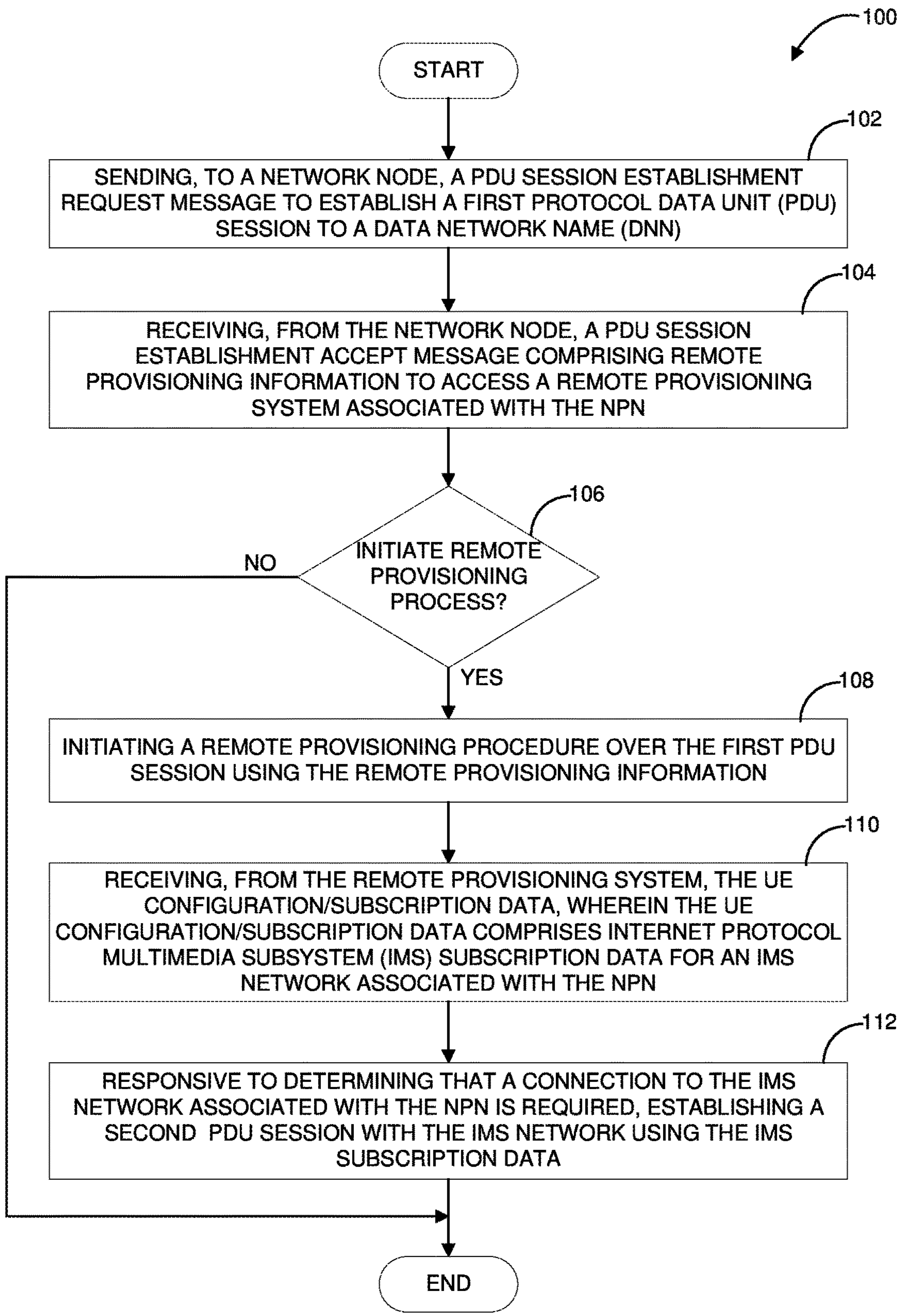
FIGS. 7A-7B are flow diagrams illustrating a method, implemented at a UE, for acquiring configuration/subscription data over an access/core network according to one embodiment of the present disclosure.
Figure 7B:
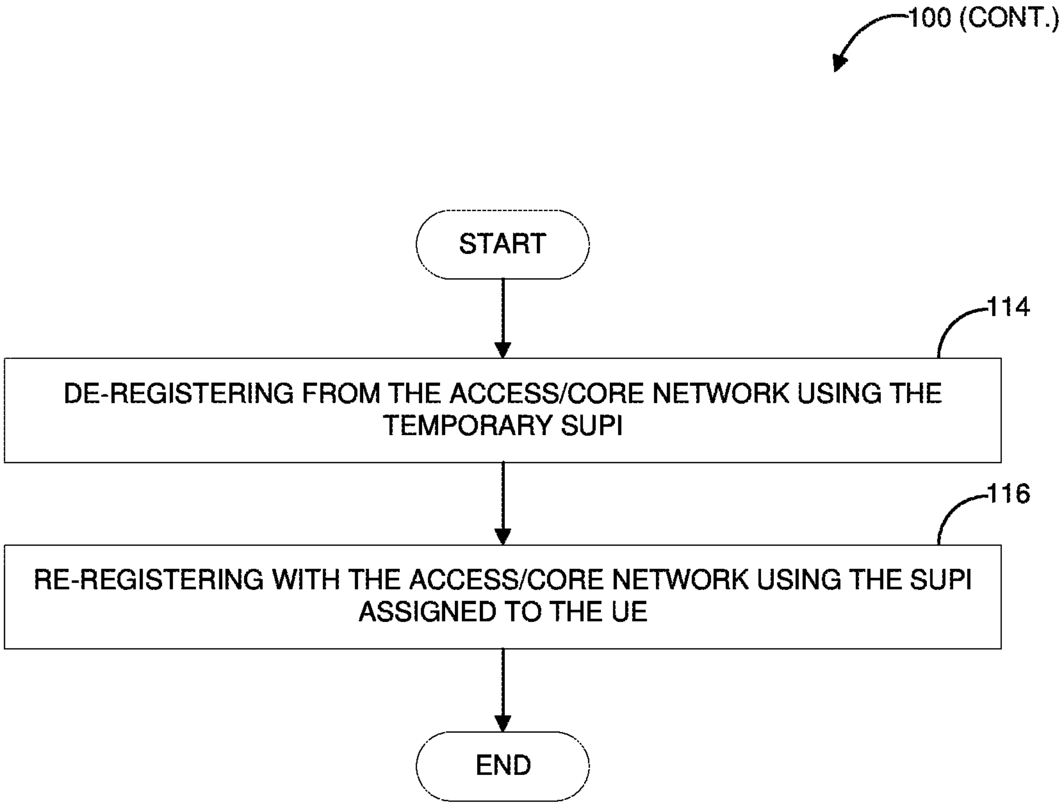

FIGS. 7A-7B are flow diagrams illustrating a method 100, implemented at a UE 18, for acquiring configuration/subscription data over an access/core network, such as NPN access network 16 and core NPN 12, according to one embodiment of the present disclosure. In particular, FIG. 7A illustrates method 100 implemented at the UE 18 regardless of whether UE 18 uses its assigned "actual" SUPI or a temporary SUPI. FIG. 7B, however, illustrates steps performed by UE 18 in cases where UE 18 uses a temporary SUPI.

As seen in FIG. 7A, UE 18 sends, to a network node (e.g., AMF 22), a PDU session establishment request message to establish a first Protocol Data Unit (PDU) session to a Data Network Name (DNN) (box 102). UE 18 then receives, from the network node, a PDU session establishment accept message in response (box 104).

In this embodiment, the received message comprises remote provisioning information needed by UE 18 to access a remote provisioning system associated with SNPN 20. The remote provisioning information may comprise any data needed or desired, but will contain all the information UE 18 needs to initiate the remote provisioning procedure. In one embodiment, for example, the remote provisioning information includes, but is not limited to, enhanced Subscriber Identity Module (eSIM) entitlement server information, one or more eSIM Information Elements (IE), NPN subscription information for the UE, authentication credentials for authenticating the UE with the remote provisioning system, and a link to an eSIM manager associated with the IMS provider.

UE 18 next determines whether it needs to initiate the remote provisioning procedure (box 106). In one embodiment, whether the UE initiates the remote provisioning procedure depends on whether the remote provisioning information is included in the PDU session establishment accept message. If not, method 100 ends and UE 18 operates normally. However, the presence of the remote provisioning information in the PDU session establishment accept message triggers the UE 18 to initiate the remote provisioning procedure (box 108).

As stated above, the UE 18 may, according to the present disclosure, utilize an "actual" SUPI or a "temporary" SUPI. In both cases, the UE 18 initiates the remote provisioning procedure over the first PDU session by sending a request to update the IMS subscription data for the UE. However, UE 18 will include its "actual" assigned SUPI in the request when it already has a SUPI assigned to it, and the "temporary" SUPI in the request when the UE 18 is using the "temporary" SUPI.

UE 18 then receives, from the remote provisioning system, the UE configuration/subscription data (box 110), which in one embodiment, comprises IMS subscription data for IMS network 14 associated with SNPN 20. In cases where the UE 18 is using a temporary SUPI, the UE configuration/subscription data received from the remote provisioning system further comprises access related subscription information for the UE, such as an "actual" SUPI that was assigned to the UE 18 during the remote provisioning process.

In at least one embodiment, the IMS subscription data comprises an IMS DNN to access the IMS network 14 of the SNPN 20. The DNN may, in some embodiments, comprise one or more of a default DNN, a DNN for a packet data network, a DNN for remote provisioning in the NPN, and a DNN for the SNPN 20.

Thereafter, responsive to determining that a connection to the IMS network 14 is required, UE 18 establishes a second PDU session with the IMS network 14 using the IMS subscription data (box 112).

As seen in FIG. 7B, UE 18, when using a temporary SUPI, UE 18 will also de-register from the NPN access network 16 and core NPN 12 using the temporary SUPI (box 114), and then re-register with these networks using the "actual" SUPI returned to it in the UE configuration/subscription data received from the remote provisioning system (box 116).

Figure 8:
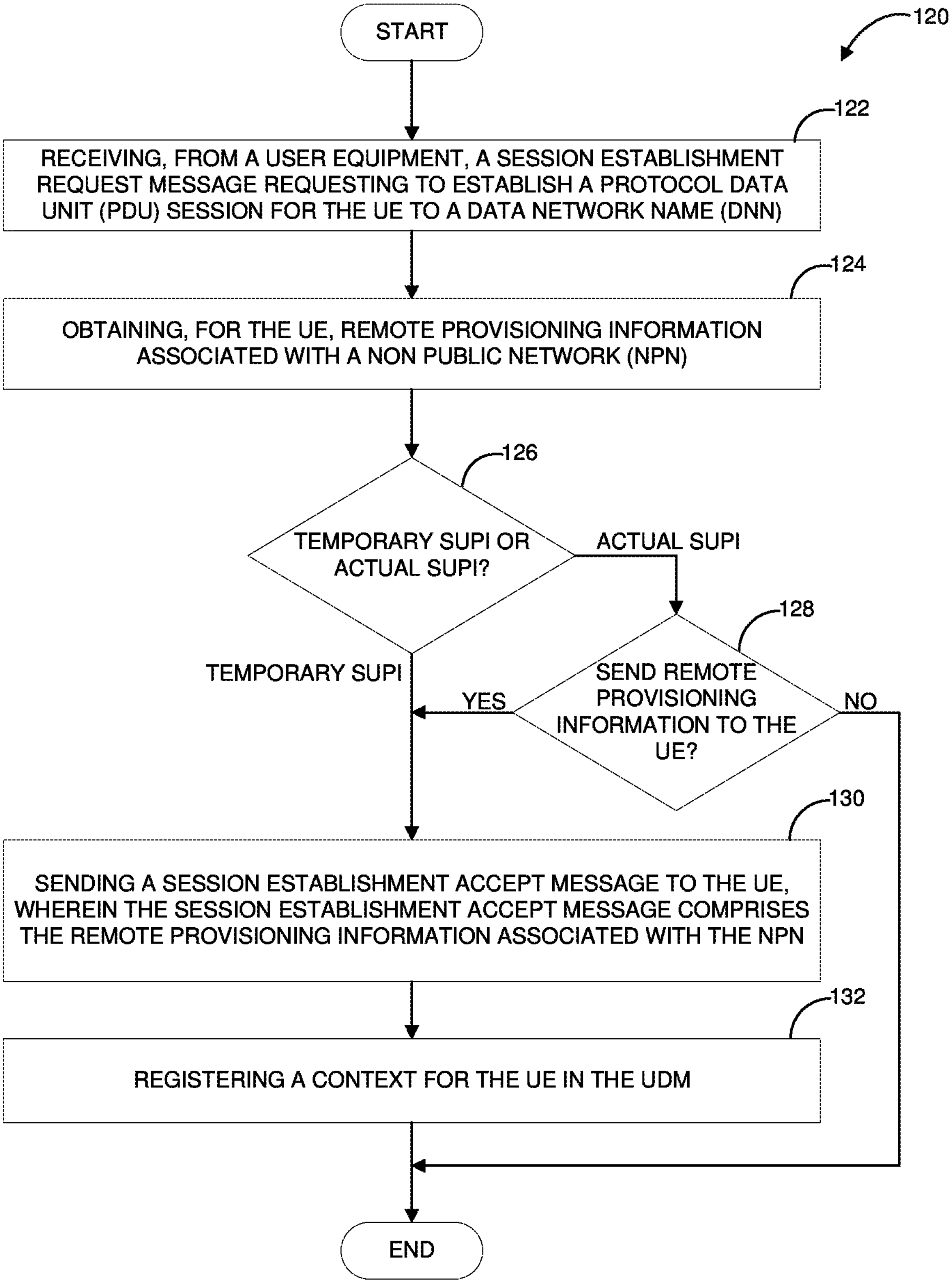
FIG. 8 is a flow diagram illustrating a method, implemented at a Session Management Function (SMF), for providing a UE with remote provisioning information according to one embodiment of the present disclosure.

FIG. 8 is a flow diagram illustrating a method 120, implemented at SMF 24, for providing a UE 18 with remote provisioning information according to one embodiment of the present disclosure. As seen in FIG. 8, SMF 24 receives a session establishment request message from UE 18, via AMF 22, requesting to establish a PDU session for the UE 18 to a DNN (box 122). As previously stated, the DNN may comprise one or more of a default DNN, a DNN for a packet data network, a DNN for remote provisioning in the NPN, and a DNN for the SNPN 20. Once received, SMF 24 obtains the remote provisioning information for the UE 18 (box 124). In one embodiment, the remote provisioning information, which is associated with SNPN 20, is received in UDM subscription information obtained from the UDM.

Next, SMF 24 will determine whether the UE 18 is using a temporary SUPI or its assigned SUPI (box 126). Such a determination may be made, for example, based on the SUPI that the UE 18 provided in the session establishment request message. If the UE 18 is using a temporary SUPI, SMF 24 sends a session establishment accept message to the UE including the remote provisioning information it obtained from the UDM 26 (box 130). If the UE 18 is using its actual SUPI, however (box 126), SMF 24 will determine whether the remote provisioning information is to be sent to the UE 18 (box 128). This determination can be based on triggering information received by SMF 24 in the subscription information obtained from the UDM 26. In one embodiment, the triggering information comprises eSIM enabling information.

If the triggering information does not indicate that the remote provisioning information should be sent to the UE 18 (box 128), method 120 ends. However, if the triggering information indicates that the remote provisioning information should be sent to the UE 18, SMF 24 includes the remote provisioning information in the session establishment accept message and sends the message to the UE 18 (box 130). Regardless of the SUPI used by UE 18, however, SMF 24 registers a context for the UE 18 in the UDM 26 (box 132).

Figure 9A:
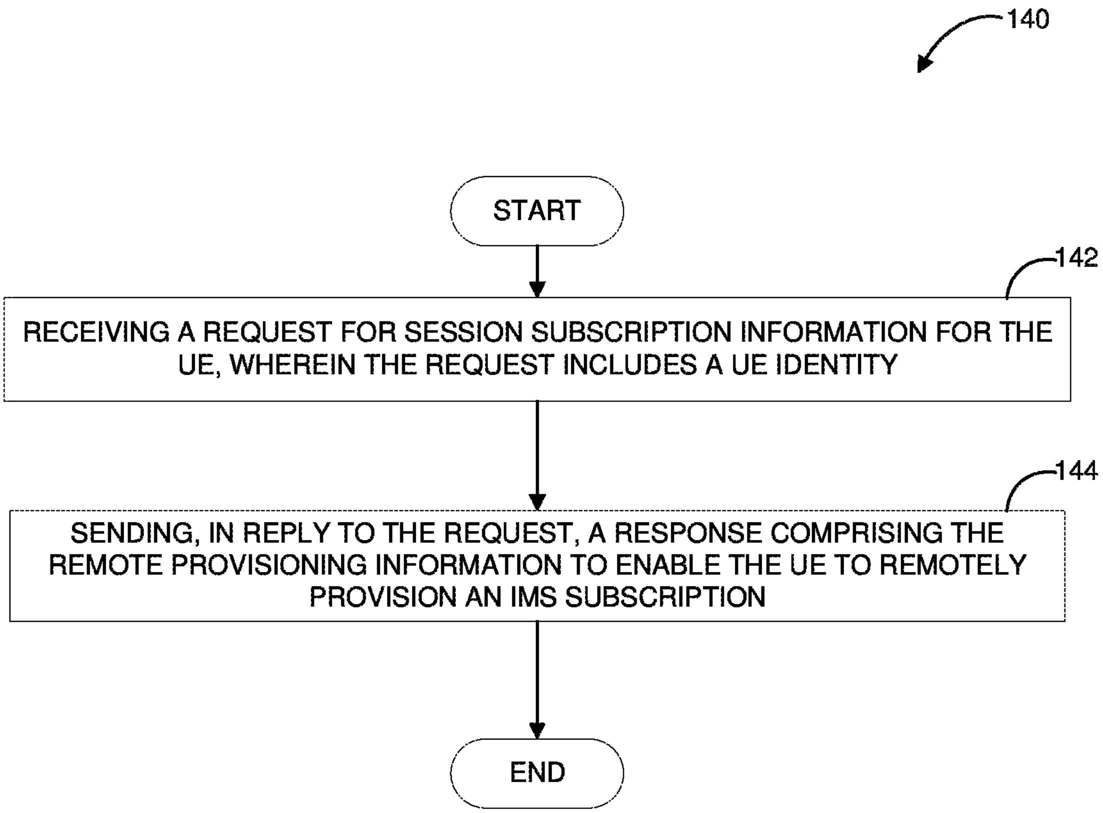
FIGS. 9A-9C are flow diagrams illustrating a method, implemented at a Unified Data Management (UDM) function, for providing an SMF with the remote provisioning information for the UE, and for creating and updating UE subscription data according to embodiments of the present disclosure.
Figure 9B:
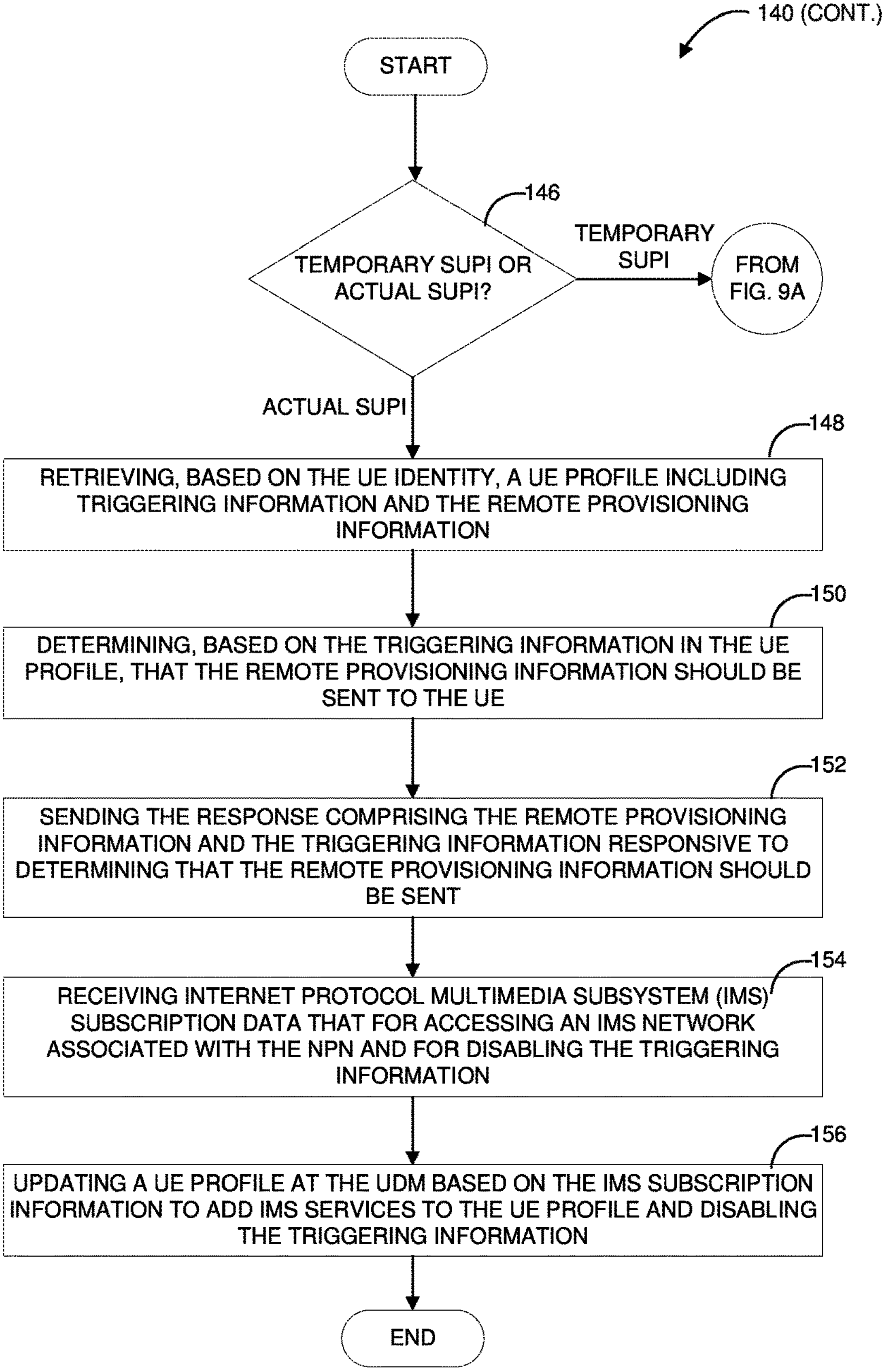
Figure 9C:
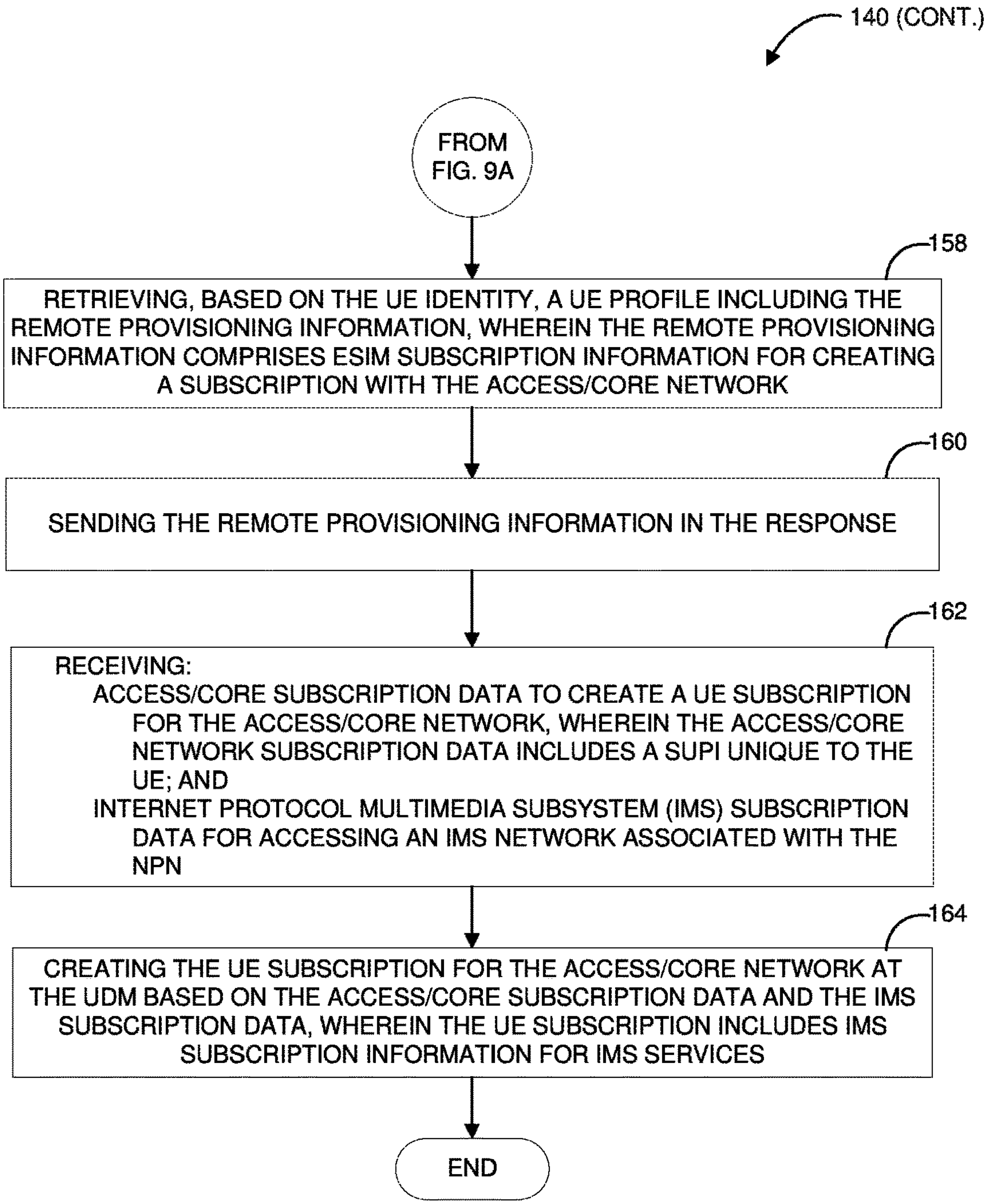

FIGS. 9A-9C are flow diagrams illustrating a method 140, implemented at UDM 26, for providing an SMF with the remote provisioning information for the UE, and for creating and updating UE subscription data according to embodiments of the present disclosure. As seen in FIG. 9A, method 140 begins with the UDM 26 receiving a request from SMF 24 for session subscription information for the UE, wherein the request includes a UE identity (box 142). In response to the request, UDM 26 sends a response message to SMF 24 comprising the remote provisioning information to enable the UE to remotely provision an IMS subscription (box 144).

How UDM 26 processes the request depends on whether the UE 18 is using its actual, assigned SUPI or a temporary SUPI. Therefore, as seen in FIG. 9B, UDM 26 determines whether the UE identity received with the request is an "actual" SUPI for UE 18 or a temporary SUPI (box 146). If it is an actual SUPI, UDM 26 retrieves, based on the UE identity, a UE profile that includes the triggering information and the remote provisioning information for the UE (box 148). Then, based on the triggering information in the UE profile, UDM 26 determines that the remote provisioning information should be sent to the UE (box 150). So determined, UDM 26 sends the response comprising the remote provisioning information and the triggering information to SMF 24 for delivery to UE 18 (box 152). Thereafter, UDM 26 receives IMS subscription data for accessing an IMS network 14 associated with the SNPN 20 and for disabling the triggering information (box 154), and updates the UE profile based on the IMS subscription information to add IMS services to the UE profile and disables the triggering information (box 156). In one embodiment, updating the UE profile at the UDM includes adding a Data Network Name (DNN) of the IMS network and disabling the triggering information in the UE profile.

FIG. 9C continues method 140 for cases where the UE identity is the UE's 18 temporary SUPI. Particularly, UDM 26 retrieves, based on the UE identity, the UE profile including the remote provisioning information (box 158). In this embodiment, the remote provisioning information comprises eSIM subscription information for creating a subscription with the NPN access network 16 and core NPN 12. The eSIM subscription information comprises, in one embodiment, eSIM entitlement server information and one or more eSIM Information Elements (IE). So retrieved, UDM 26 sends the remote provisioning information in the response to SMF 24 for delivery to UE 18 (box 160).

Thereafter, UDM 26 receives the access/core subscription data needed to create a UE subscription for the NPN access network 16 and core NPN 12, which includes an actual SUPI for the UE 18, and the IMS subscription data for accessing IMS network 14 (box 162). UDM 26 then creates the UE subscription for the NPN access network 16 and core NPN 12 at the UDM 26 based on the access/core subscription data and the IMS subscription data. In one embodiment, the UE subscription includes IMS subscription information for IMS services (box 164).

Figure 11:
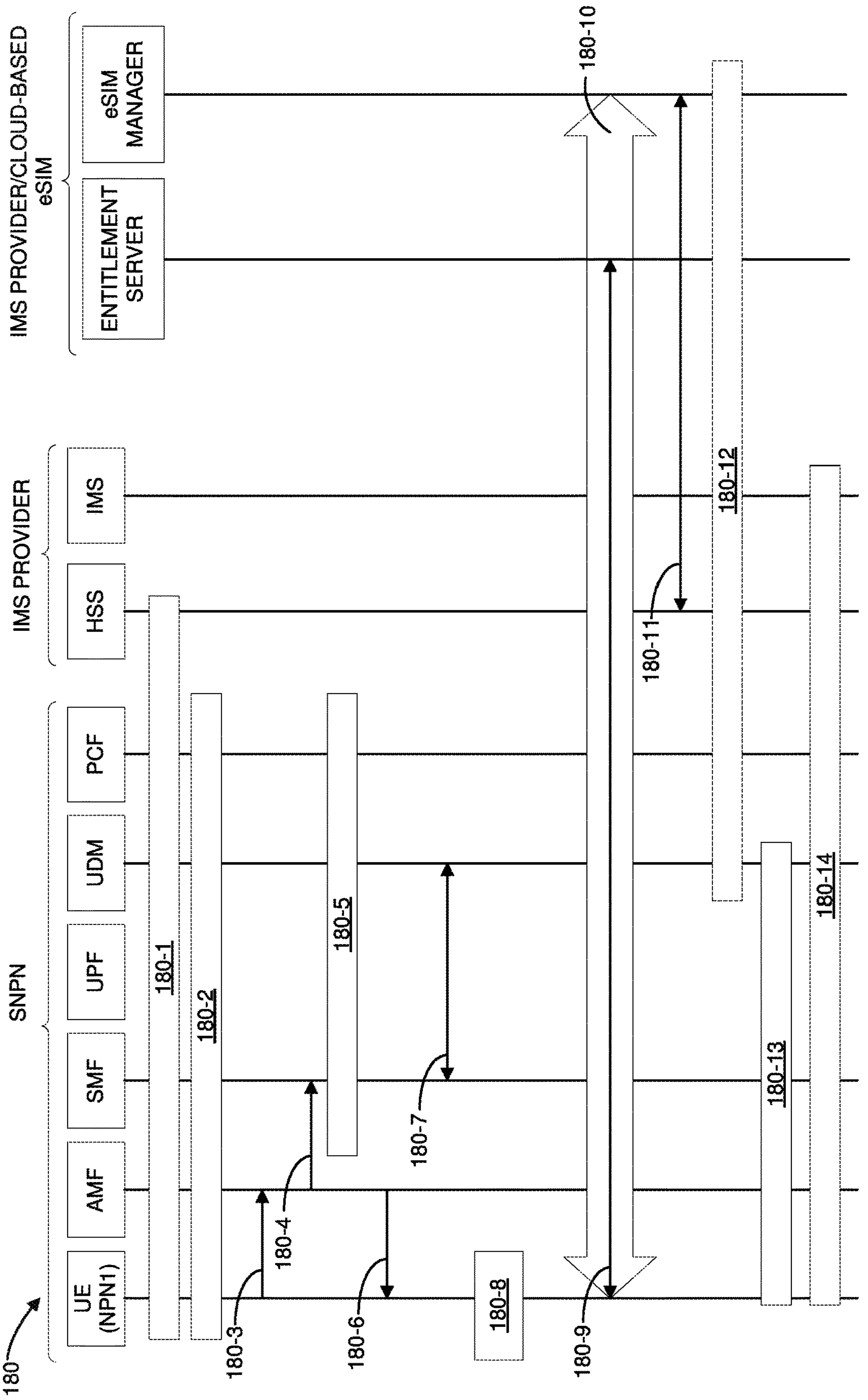
FIG. 11 is a signaling diagram illustrating a call flow for providing IMS services to a UE according to another embodiment of the present disclosure.
Figure 12:
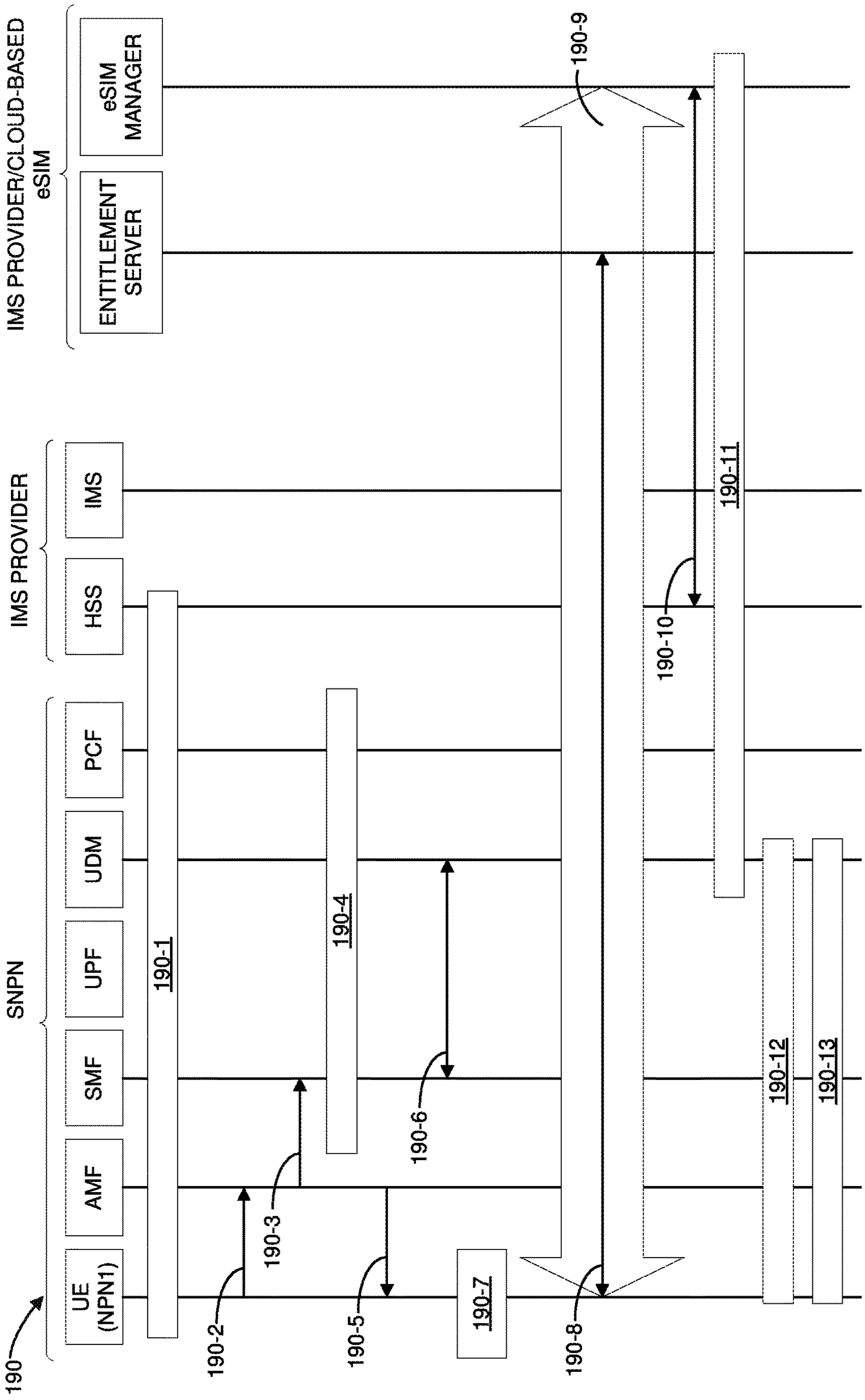
FIG. 12 is a signaling diagram illustrating a call flow for providing IMS services to a UE according to another embodiment of the present disclosure.

According to embodiments of the present disclosure, the remote provisioning information received by UE 18 can be utilized to provision UE access credentials for the IMS network 14 (e.g., the signaling diagrams of FIGS. 10-11), or for both the SNPN 20 and the IMS network 14 (signaling flow diagram of FIG. 12).

More particularly, in some embodiments, the UE 18 can be pre-configured with the remote provisioning information needed to access the eSIM Manager, or UE 18 can receive the remote provisioning information in a PDU Session Establishment Accept Response received from AMF 22. To accomplish this function, one embodiment of the present disclosure provides a pre-defined DDN. The pre-defined DNN, referred to herein as a "RemoteProvisioning DNN," is a dedicated DNN used only for remotely provisioning UE

18. Not only does the pre-defined DNN enable UE 18 to interact with the eSIM Manager for purposes of onboarding (i.e., remote provisioning), but it also enables UE 18 to establish connectivity only with the remote provisioning system (i.e., user plane). Such interaction may be enforced by SMF 24 using policies that are either (1) pre-configured in the SMF 24, or (2) included in an Information Element (IE) associated with the "RemoteProvisioning" DNN, or by using PCF 28.

In some embodiments, the pre-defined "RemoteProvisioning" DNN is configured and stored at UE 18. However, these are not the only functions for the "RemoteProvisioning" DNN. For example, based on the "RemoteProvisioning" DNN, the AMF 22 may be configured to select a particular SMF 24 that has been dedicated for provisioning. To select a particular SMF 24, AMF 22 may use Network Repository Function (NRF) discovery procedures, or be locally configured for that purpose. An SMF 24 dedicated for remote provisioning of UE 18, according to some embodiments, would register such a capability in the NRF as part of its profile. The AMF 22 may also be configured to use Domain Name Servers (DNS) for SMF selection purposes based on the pre-defined DNN.

Once the IMS access credentials are successfully provisioned in UE 18, the "RemoteProvisioning" DNN may be removed from the DNN subscription list of UE 18. Additionally, the IMS DNN can be inserted into the UE's DNN subscription list, if it is not already there. As in the previous embodiments, UE 18 initiates remote provisioning by requesting to establish a PDU session to the "RemoteProvisioning" DNN.

The information needed by UE 18 to interact with the eSIM Manager can be included in the UE Session Management Subscription data as a new IE associated with the pre-defined "RemoteProvisioning" DNN, or be pre-configured in the SMF 24. In either case, the information is included in a PDU Session Establishment Accept Response message, and passed transparently to UE 18 via AMF 22. In some optional embodiments, a network operator may pre-configure the remote provisioning information in UE 18. In these latter cases, no remote provisioning information is returned to UE 18 in the PDU Session Establishment Accept Response message.

To enable the SNPN 20 to provision UE 18 with new IMS access credentials in the event of a change in the IMS provider, or due to other reasons, the SNPN provider, through administrative procedures, may remove the IMS DNN and may re-insert the "RemoteProvisioning" DNN if not there already. UDM issues a UE Update Procedure to request the UE to re-register and initiate onboarding. The network also releases the IMS PDU session if applicable.

As previously stated, the pre-defined DNN and the IMS DNN may, in some embodiments, be removed and/or added to the UE's DNN subscription list. However, with the present embodiments, this is not required. Maintaining one or both of the pre-defined "RemoteProvisioning" DNN and the IMS DNN in the DNN subscription list in the SNPN UE subscriber profile at all times, even after the UE credentials have been successfully downloaded, will not cause an issue if UE tried to download additional credentials. In such cases, the UE 18 will simply be denied for downloading the additional credentials. Further, a UE without valid IMS credentials will simply fail to register with the IMS network 14 even if UE 18 had already successfully established an IMS PDU session. This also applies in the event of a change in IMS providers from an old IMS provider to a new IMS provider. Specifically, credentials that were valid under the old IMS provider will not work with the new IMS provider. This facilitates the management of the UE profile in the SNPN.

Figure 10:
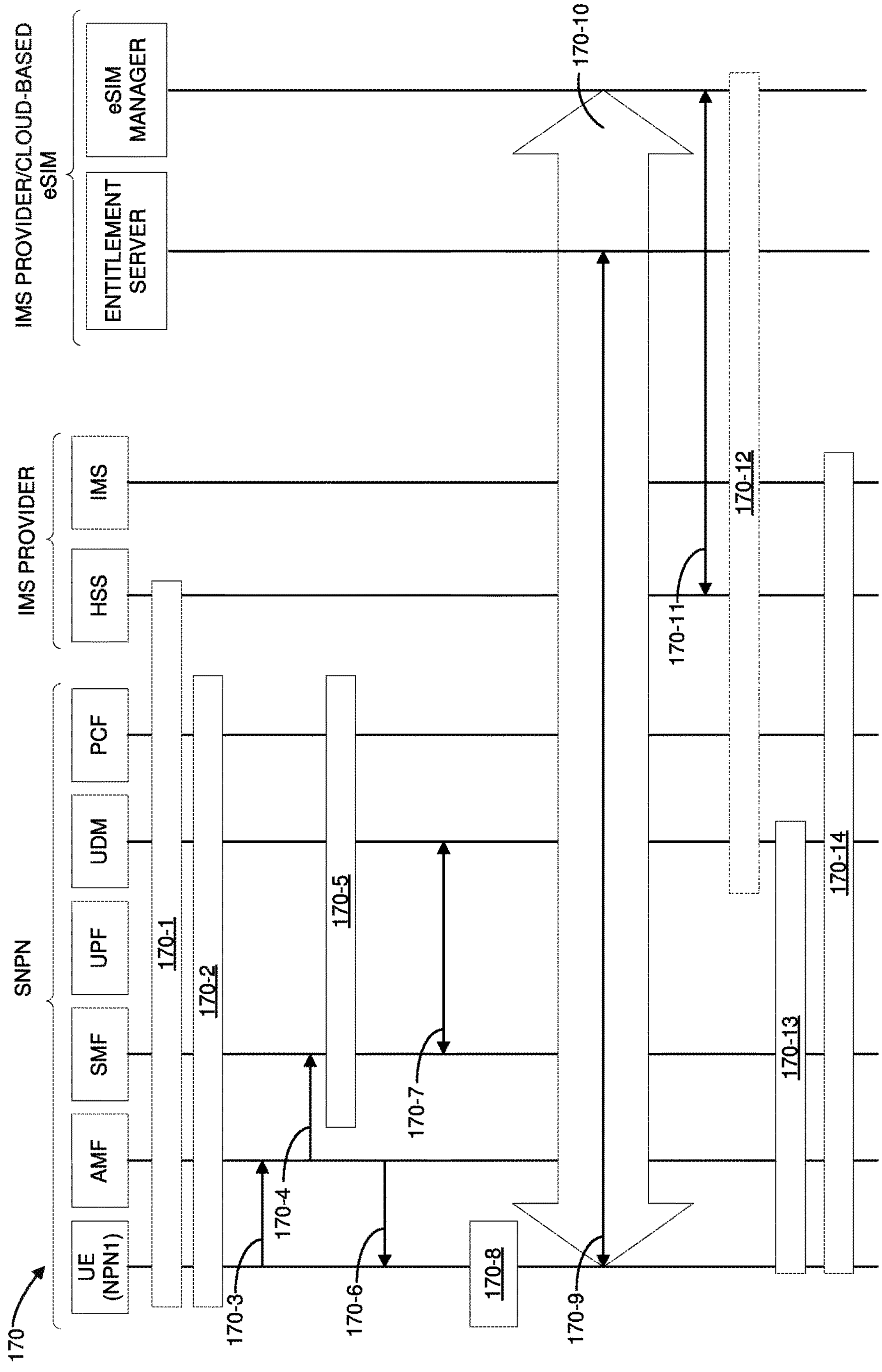
FIG. 10 is a signaling diagram illustrating a call flow for providing IMS services to a UE according to another embodiment of the present disclosure.

FIG. 10 illustrates a signaling diagram 170 showing a call flow procedure for onboarding IMS credentials to UE 18 via remote provisioning using a pre-defined "RemoteProvisioning" DNN.

In this embodiment, it is assumed that UE 18 has already acquired the information it needs to access NPN access network 16 via the onboarding process (box 170-1).

In box 170-2, UE 18 performs a 5GC registration in accordance with the procedures specified in 3GPP TS 23.502 V16.4.0: "Procedures for the 5G System (5GS); Stage 2" (Release 16) dated March 2020.

In box 170-3, UE 18 initiates a PDN connection for the pre-defined "RemoteProvisioning" DNN in accordance with the procedures specified in 3GPP TS 23.502. In this embodiment, the pre-defined "RemoteProvisioning" DNN is pre-configured in the UE.

In line 170-4, AMF 22 initiates an Nsf_PDUSession_CreateSMContext Request towards a selected SMF 24. As previously described, AMF 22 may select a particular SMF 24 using Network Repository Function (NRF) discovery procedures, or it may be locally configured for this purpose, or it may use DNS.

In line 170-5, SMF 24 fetches the session subscription related information. Based on the pre-defined "RemoteProvisioning" DNN, and if the UE is not pre-configured with the remote provisioning information, SMF 24 includes the remote provisioning information in a response to UE 18. Particularly, SMF 24 is configured to include the remote provisioning information as transparent information transported to the UE in a PDU Session Accept response in cases where the remote provisioning information is pre-configured in the SMF 24, or where the remote provisioning information is received from UDM 26. In cases where the UE 18 is already pre-configured with the remote provisioning information, then SMF 24 will not include the remote provisioning information in the PDU Session Accept response sent to UE 18. SMF 24 does, however, fetch the related policies and uses them to ensure that UE 18 will only initiate communication with the remote provisioning system.

In box 170-6, the PDU Session Establishment Accept Response is tunneled to UE 18 via AMF 22. In this embodiment, the PDU Session Establishment Accept Response message includes the remote provisioning related information that UE 18 needs to initiate remote provisioning (i.e., the UE 18 is not already pre-configured with the remote provisioning information).

In line 170-7, the SMF registers the UE context in UDM.

In line 170-8, the received remote provisioning information triggers the remote provisioning process in UE 18. In embodiments where UE 18 is already pre-configured with the information, the remote provisioning information still triggers the remote provisioning process in UE 18.

In box 170-9, UE 18 initiates interaction with the remote provisioning system. The UE 18 includes the Information Elements (IEs) required by the remote provisioning system. Such information includes, but is not limited to, identity binding information that enables the IMS provider and the SNPN 20 to identify the same UE 18 for interaction between network nodes, such as the HSS 36, for example, and the UDM 26. By way of example only, a SUPI can be binding information.

In line 170-10, UE 18 downloads eSIM data in accordance with the previously identified GMSA: "RSP Technical Specification" and "GSMA: "Remote Provisioning Architecture for embedded UICC Technical Specification Version."

In box 170-11, an eSIM manager associated with the IMS provider provisions a network node such as HSS 36 with the requisite provisioning information so that it can update the UE subscription.

In line 170-12, the UDM 26 is informed that onboarding has been successfully completed. The UDM 26 then updates the UE subscription to add the IMS DNN. UDM 26 may perform other needed updates as well. By way of example, UDM 26 may remove the pre-defined "RemoteProvisioning" DNN.

In this embodiment, line 170-12 is optional. Nevertheless, SNPN 20 may provision the IMS DNN in the UE profile after line 170-12 or at any time. Such interaction with the IMS network 14 will be successful only if the IMS credentials have been successfully downloaded.

At this point, the remote provisioning procedure is complete. Thus, in box 170-13, UE 18 can initiate an IMS PDN connection to establish an IMS PDU session.

In box 170-14, UE 18 uses the eSIM credentials it received to initiate IMS procedures based on existing specifications 3GPP TS 23.228 V16.4.0 "IP Multimedia Subsystem (IMS); Stage 2 (Release 16)" dated March 2020.

FIG. 11 is a signaling diagram 180 illustrating a variant for the remote provisioning of the IMS access credentials via eSIM remote provisioning. In this embodiment, a new PDU Establishment Request type labelled "Onboarding" is introduced. Additionally, the pre-defined DNN is a dedicated DNN used specifically for onboarding. The pre-defined DNN can be configured in AMF 22, or in UE 18, and used for this new PDU Establishment Request Type. UEs authorized to perform onboarding will have this dedicated DNN in their DNN subscription list. The dedicated DNN for onboarding enables connectivity for the UE 18 only to the remote provisioning system. This aspect of the present embodiment is enforced through policies that are either (1) pre-configured in SMF 24, or (2) included in an IE associated with the dedicated DNN, or by using the PCF. The AMF may select a special SMF dedicated for provisioning, based on the dedicated DNN. The AMF 22 may use NRF discovery procedures, or be locally configured, to perform these functions. An SMF 24 dedicated for provisioning would register such a capability in the NRF as part of its profile. The AMF 22 can also use DNS for SMF selection purposes based on the dedicated DNN.

Once the IMS access credentials are successfully provisioned in the UE 18, the pre-defined dedicated DNN may be removed from the UE DNN subscription list. The new IMS DNN may then be added, if it is not already in the UE DNN subscription list.

As previously described, the information needed by the UE to interact with the eSIM Manager can be included in the UE Session Management Subscription data as a new IE associated with the dedicated DNN for onboarding, or it may be pre-configured in SMF 24. In both cases, the remote provisioning information is included in the PDU Session Establishment Accept Response message and passed transparently to UE 18. Optionally, in some embodiments, a network operator may pre-configure this information in the UE 18. In these latter cases, no remote provisioning information will be returned to the UE 18 in the PDU Session Establishment Accept Response message.

To enable the SNPN 20 to provision UE 18 with new IMS access credentials, such as may be needed when the IMS provider changes (or due to other reasons), the SNPN 20 provider may remove the IMS DNN from the UE subscription list and re-insert the dedicated DNN into the UE subscription list for onboarding. In such embodiments, UDM 26 may be configured to issue a UE Update Procedure to request UE 18 to re-register and initiate onboarding.

As a variant of this embodiment, an internet DNN can be used for onboarding purposes. In these cases, the value of a new parameter—i.e., the PDU establishment Request type—is used to determine whether the internet DNN is used for eSIM remote provisioning or for regular use. Filters controlling internet DNN usage can be either pre-configured in the SMF or in IE associated with the internet DNN, or in the PCF and applied as needed.

Additionally, although the PDU Establishment Request type determines the usage of the filter, the PDU Establishment Request type, by itself, is not sufficient. Rather, an additional IE associated with the internet DNN is needed to enable the network to control whether the internet DNN is used for regular usage, or for eSIM remote provisioning, and ensure that the UE is performing the correct procedure. Once the IMS access credentials are successfully provisioned in UE 18, the IMS DNN is added to the subscription list, provided that it is not already in that list, and the internet DNN is enabled for regular usage.

It should be noted that, according to the present disclosure, the internet DNN can also be used in situations where no new Establishment Request type is used, such as the procedure illustrated in signaling diagram 170 of FIG. 10, for example. In these cases, an additional IE associated with the internet DNN is used to enable the network to control whether the internet DNN is employed for regular usage or for onboarding and ensures that UE 18 performs the correct procedure accordingly.

To provision the UE with new IMS access credentials, in this aspect, the SNPN provider can simply enable, via administrative procedures, the remote provisioning IE associated with the internet DNN. Additionally, the SNPN provider may remove the IMS DNN. Such aspects may be performed, for example, whenever the IMS provider changes, or due to some other reason. Regardless, the UDM 26 issues a UE Update Procedure to request UE 18 to re-register and initiate onboarding.

As in the previous embodiment, maintaining a dedicated DNN, if one is used, in the UE subscription list for provisioning after successfully downloading the UE credentials will not cause an issue if the UE 18 tries to download additional credentials. In these cases, UE 18 will simply be denied to download the additional credentials. Similarly, maintaining the IMS DDN in the DNN subscription list in the SNPN UE subscriber profile at all times does not cause any undesirable issues. In these cases, a UE 18 without valid IMS credentials will simply fail to register with the IMS, even in cases where the UE has already successfully established an IMS PDU session. These aspects are also true in the event of a change from one IMS provider to a new IMS provider. In these situations, the old credentials will fail to work with the new IMS provider. This facilitates the UE profile management in the SNPN 20.

FIG. 11 is a signaling diagram 180 illustrating a procedure for the onboarding of IMS credentials via remote provisioning using a new parameter—i.e., the PDU Establishment Request type—and a dedicated DNN described above. Most of the steps in FIG. 11 (i.e., 180-1-180-3, 180-6-180-11, 180-13-180-14) are the same as the corresponding steps in FIG. 10. Therefore, those steps are not described again. Rather, only those steps that are different are described below with respect to FIG. 11.

Particularly, in line 180-4, SMF 24 performs the necessary checks to enable the appropriate use of the internet DNN.

In box 180-5, the SMF 24 fetches the policies depending on the DNN used.

Box 180-12 is optional as it was box 170-12 in the previous embodiment when the dedicated DNN is used. However, if an internet DNN is used, box 180-12 is required to be performed to disable the eSIM provisioning IE element associated with the DNN. Additionally, the SNPN 20 will need to know the SUPI allocated to UE 18 so that UE 18 can de-register the temporary SUPI it used to establish the session, and re-register with the allocated SUPI.

FIG. 12 is a signaling diagram 190 illustrating an embodiment where the credentials provided to UE 18 are used to access both the SNPN access network 16 and the IMS network 14. The call flow illustrated in FIG. 12 is similar to signaling diagram 80 in FIG. 5. In this embodiment, the approaches previously described with respect to the options for including the required provisioning elements and the usage of the DNN, also apply to this embodiment. Thus, steps 190-1-190-10 and 190-12 190-13 are not described again in detail.

Note, however, that in the embodiment of FIG. 12, performing box 190-11 is not optional, as it is in the embodiments of FIGS. 10 (i.e., box 170-12) and 11 (i.e., box 180-12). Rather, it is mandatory. This is because UE 18 will have de-registered the temporary SUPI it used to establish the session, and re-registered with the allocated SUPI. Thus, the SNPN 20 will need to know the SUPI allocated to UE 18 to create the correct UE subscription.

The embodiments described herein provide a simple method for allowing SNPN users to use an IMS network with only minor changes to the impacted nodes, and without requiring anything specific from the SNPNs. Further, the present embodiments advantageously provide such benefits without having to provision the IMS credentials in the UE device.

Figure 13A:
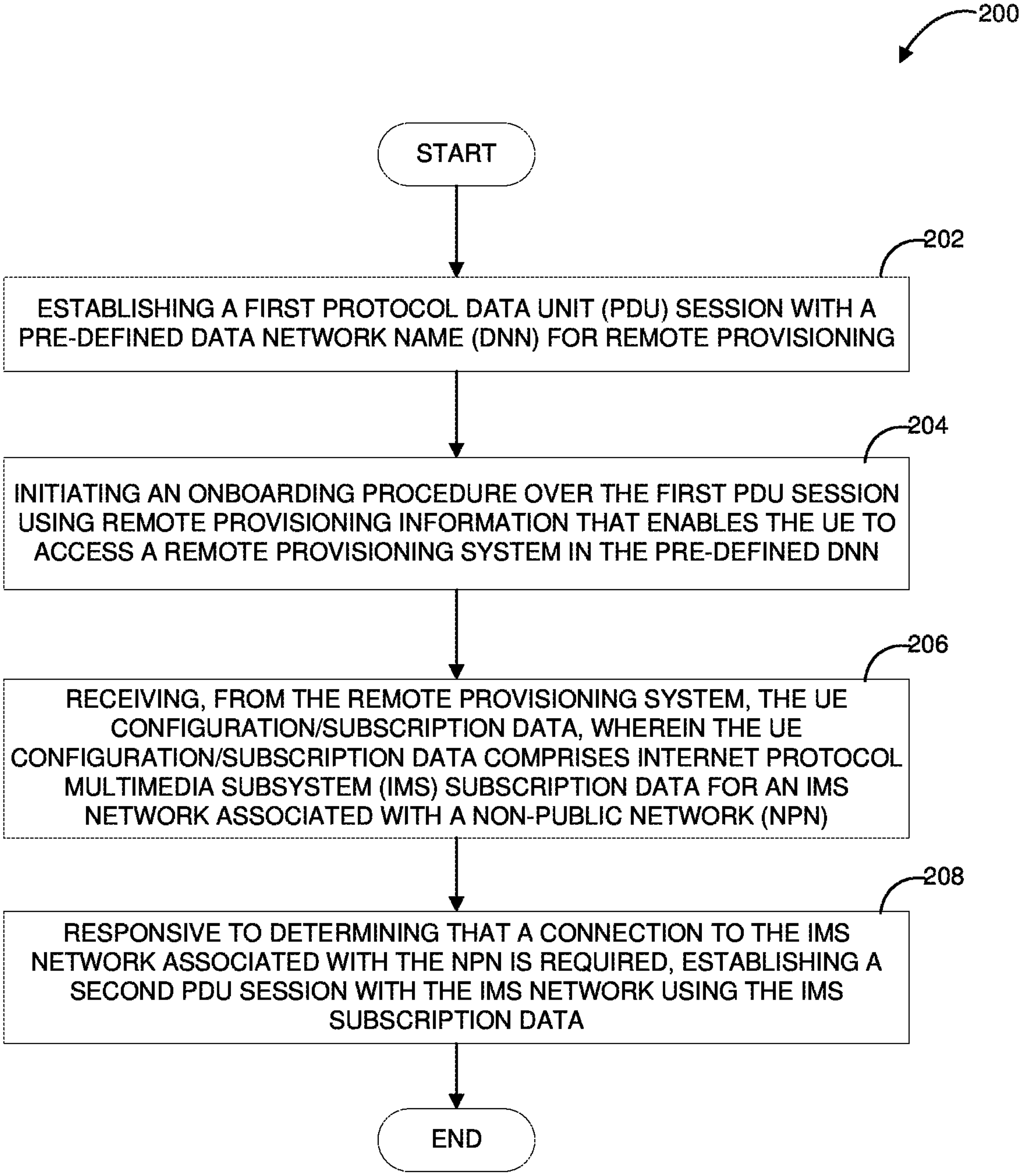
FIGS. 13A-13C are flow diagrams illustrating a method, implemented at a UE, for acquiring configuration/subscription data over an access/core network according to one embodiment of the present disclosure.
Figure 13B:
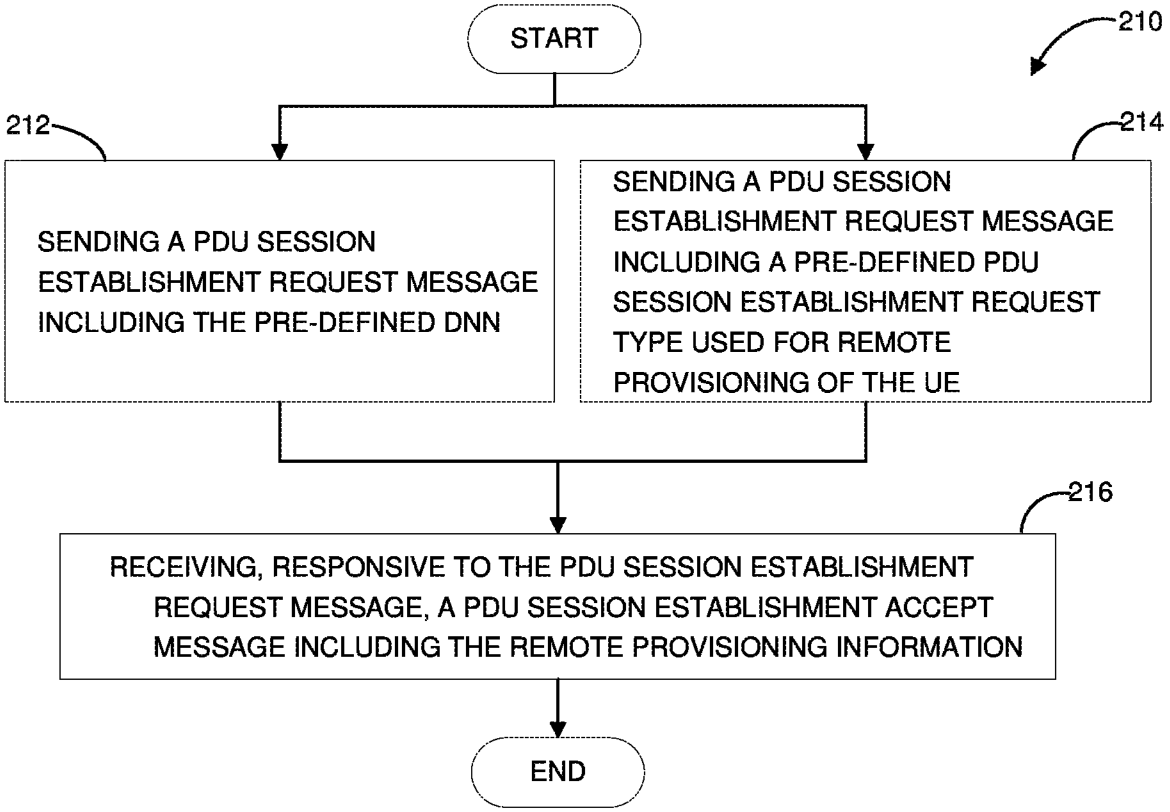
Figure 13C:
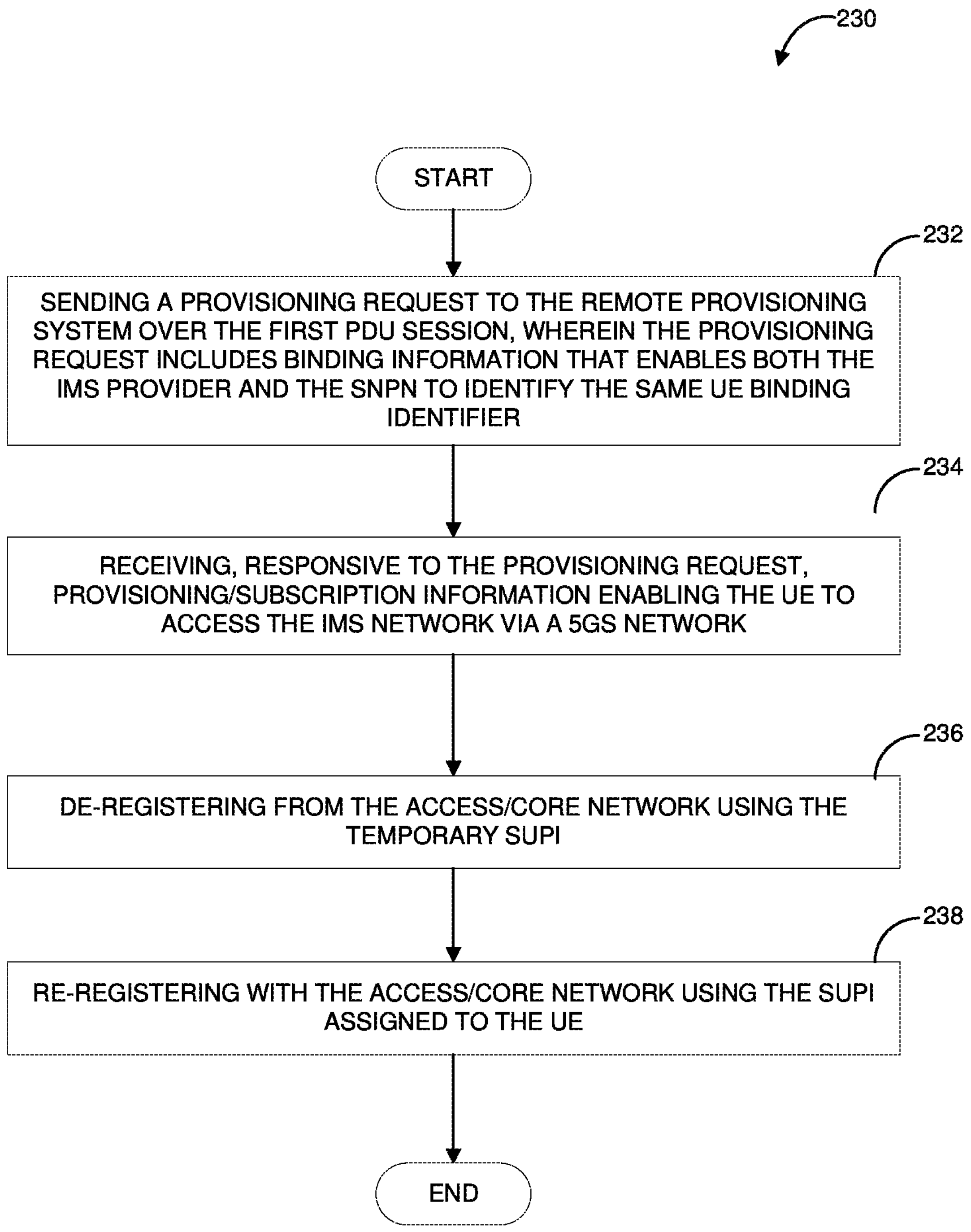

FIGS. 13A-13C are flow diagrams illustrating methods 200, 210, 220, and 230, respectively, implemented at a UE, for acquiring configuration/subscription data over an access/core network according to one embodiment of the present disclosure.

As seen in FIG. 13A method 200 begins with UE 18 establishing a first Protocol Data Unit (PDU) session with a pre-defined Data Network Name (DNN) for remote provisioning (box 202). UE 18 then initiates a remote provisioning procedure over the first PDU session using remote provisioning information that enables the UE to access a remote provisioning system in the pre-defined DNN (box 204). UE 18 then receives, from the remote provisioning system, the UE configuration/subscription data. In this embodiment, the UE configuration/subscription data comprises Internet Protocol Multimedia Subsystem (IMS) subscription data for an IMS network associated with a Non-Public Network (NPN). Responsive to determining that a connection to the IMS network associated with the NPN is required, UE 18 establishes a second PDU session with the IMS network 14 using the IMS subscription data.

FIG. 13B illustrates a method 210 in which UE 18 establishes a first Protocol Data Unit (PDU) session with the remote provisioning Data Network Name (DNN). In one embodiment, UE 18 sends, to a network node, a PDU session establishment request message including the pre-defined DNN (box 212). In another embodiment, however, UE 18 sends, to a network node, a PDU session establishment request message including a pre-defined PDU session establishment request type used for remote provisioning of the UE 18 (box 214). In either case, UE 18 receives a PDU Establishment Accept message that may include the remote provisioning information (box 216).

FIG. 13C is a flow diagram illustrating a method 230 implemented at UE 18 gaining access to both the SNPN access network 16 and the IMS network 14 using the credentials received with the remote provisioning information. As seen in FIG. 13D, method 230 begins with UE 18 sending a provisioning request to the remote provisioning system over the first PDU session (box 232). In this aspect, as previously described, the provisioning request includes, inter alia, identity binding information that enables both the IMS provider and the SNPN 20 to identify the same UE binding identifier. In response to the provisioning request, UE 18 receives provisioning/subscription information that enables the UE 18 to access the IMS network 14 via a 5GS network (e.g., SNPN 20 and SNPN access network 16) (box 234). So received, UE 18 can de-register from the access/core network using the temporary SUPI (box 236), and register with the access/core network using the SUPI assigned to UE 18 (box 238).

Figure 14:
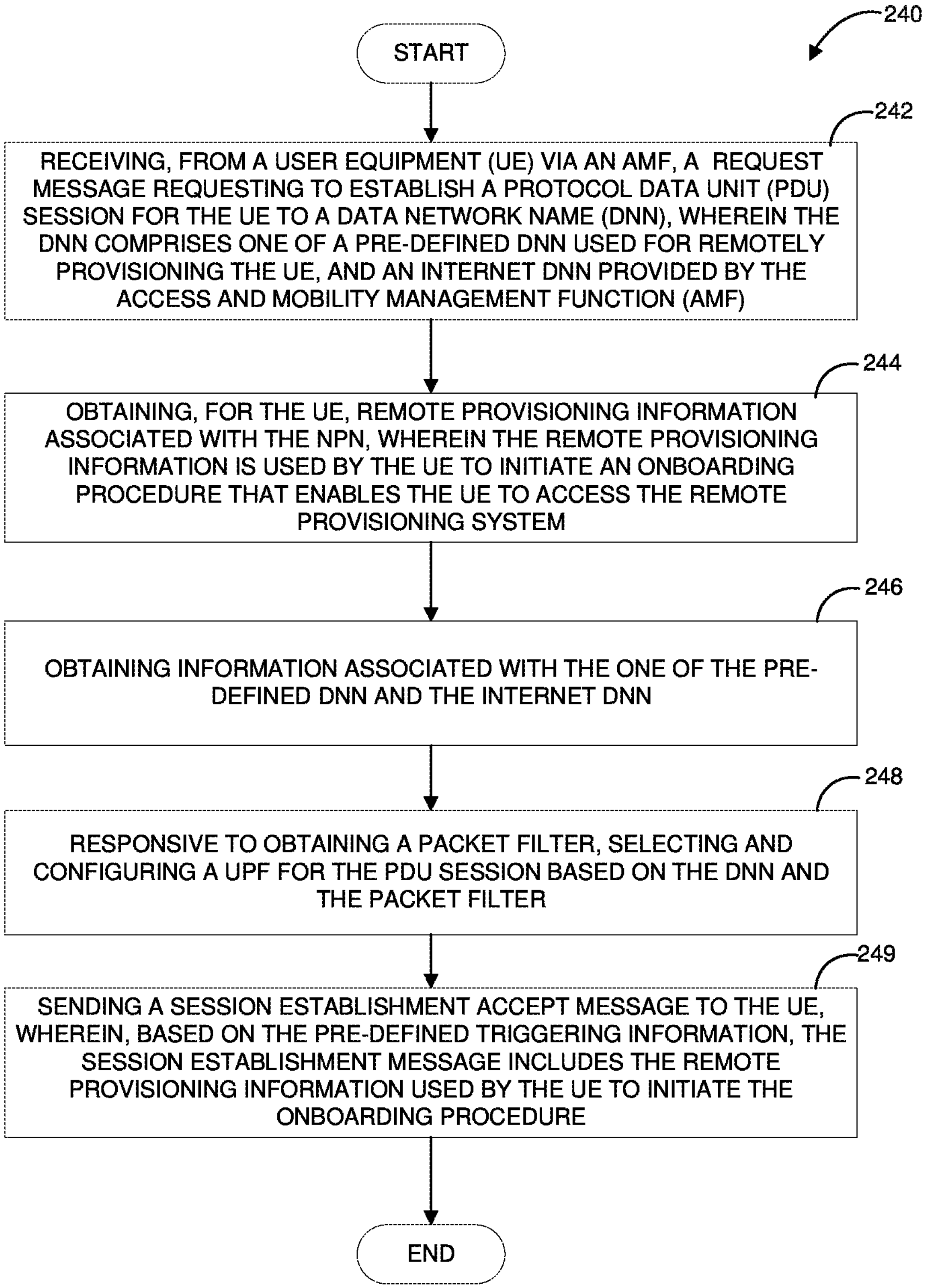
FIG. 14 is a flow diagram illustrating a method, implemented at a Session Management Function (SMF), for providing a UE with remote provisioning information according to one embodiment of the present disclosure.

FIG. 14 is a flow diagram illustrating a method 240, implemented at SMF 24, for providing UE 18 with remote provisioning information according to one embodiment of the present disclosure. In some embodiments, SMF 24 is dedicated for provisioning purposes and is selected by AMF 22. To accomplish selection, AMF 22 may be locally configured to select SMF 24, or it may use NRF discovery procedures. In such cases, SMF 24 would have registered its capabilities in the NRF as part of its profile.

As seen in FIG. 14, SMF 24 receives, from UE 18 via AMF 22, a request message requesting to establish a Protocol Data Unit (PDU) session for the UE to a Data Network Name (DNN) (box 242). In this embodiment, the request message includes pre-defined triggering information, such as a pre-defined DNN, a session establishment request type, an internet DNN, and the like. SMF 24 then obtains, for UE 18, remote provisioning information associated with the SNPN 20 (box 244). SMF 24 also obtains information associated with the one of the pre-defined DNN and the internet DNN (box 246) and, responsive to obtaining a packet filter, selects and configures a UPF for the PDU session based on the DNN and the packet filter (box 248). SMF 24 then sends a session establishment accept message to the UE (box 249). In this aspect, the session establishment accept message may include the remote provisioning information.

Figure 15:
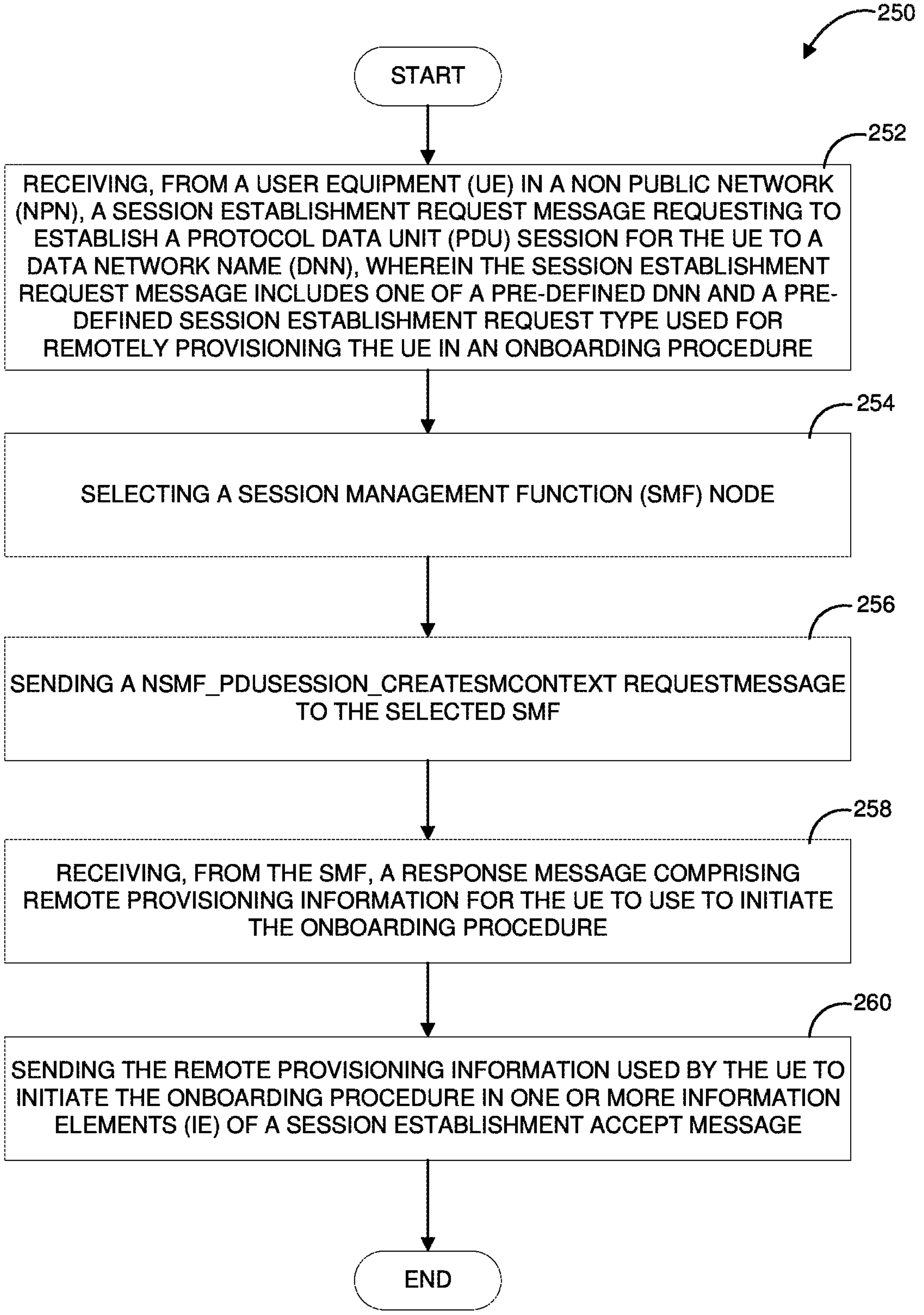
FIG. 15 is a flow diagram illustrating a method, implemented at Access and Mobility Management Function (AMF), for providing a UE with remote provisioning information according to one embodiment of the present disclosure.

FIG. 15 is a flow diagram illustrating a method 250 for providing UE 18 with remote provisioning information according to one embodiment of the present disclosure. In this embodiment, method 250 is implemented at an Access and Mobility Management Function (AMF), such as AMF 22.

As seen in FIG. 15, AMF 22 receives, from UE 18 in SNPN 20, a session establishment request message requesting to establish a Protocol Data Unit (PDU) session for the UE to a Data Network Name (DNN) (box 252). In this aspect, the session establishment request message includes pre-defined triggering information, such as a pre-defined DNN, a session establishment request type, an internet DNN, and the like. AMF 22 then selects an SMF 24 (box 254) and sends an Nsmf_PDUSession_CreateSMContext Request message to the selected SMF 24 (box 256). As stated above, AMF 22 may be locally configured to select SMF 24, or it may use NRF discovery procedures. In these latter situations, SMF 24 would have registered its capabilities in the NRF as part of its profile. Thereafter, AMF 22 may receive, from SMF 24, a response message (box 258). In this aspect, the response message may include the remote provisioning information for UE 18 to use to initiate the remote provisioning procedure. AMF 22 then forwards the response message received from SMF 24 transparently to UE 18 (box 260). As stated previously, an information element (IE) of the response message received from SMF 24 may include the remote provisioning information.

Figure 16:
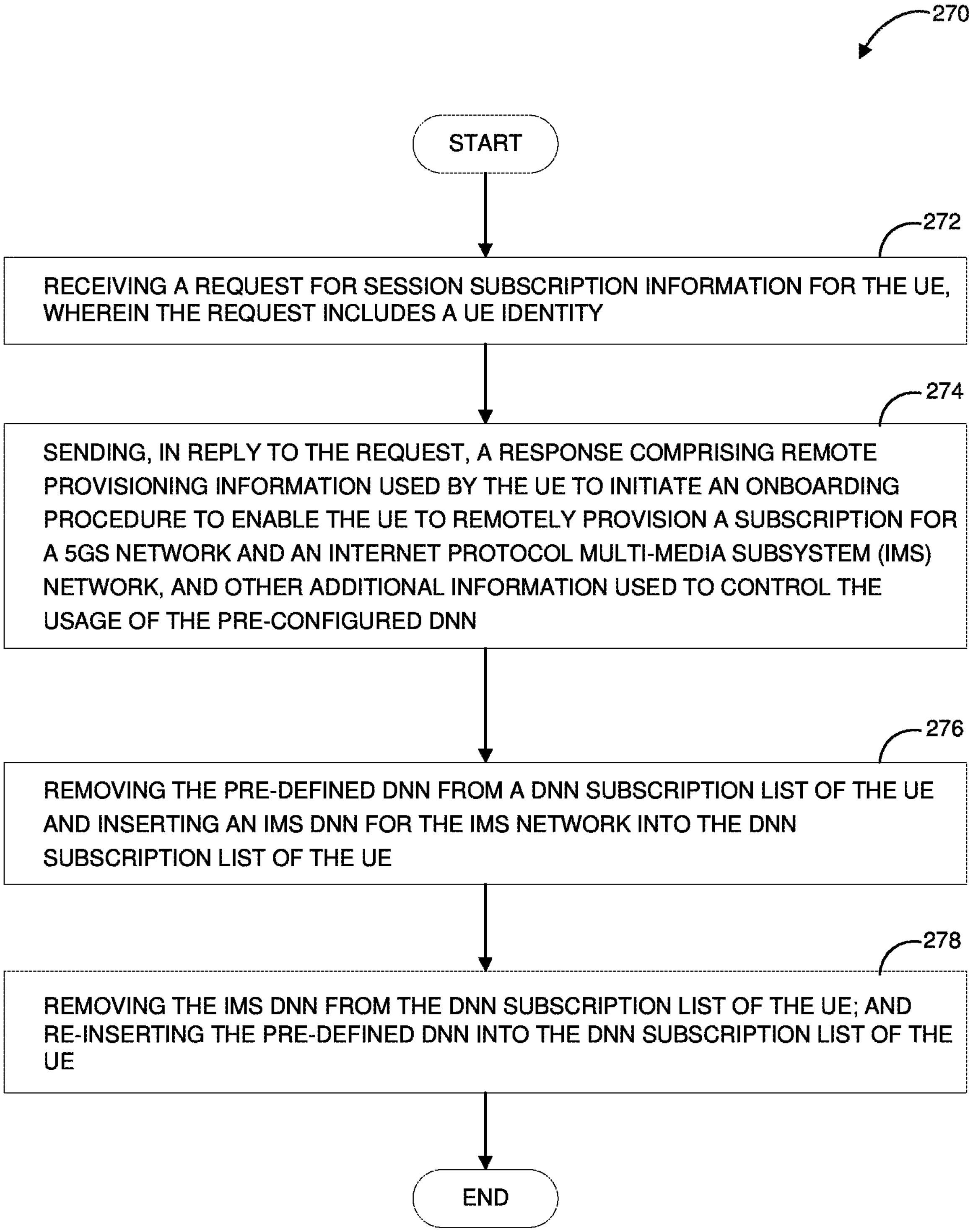
FIG. 16 is a flow diagram illustrating a method, implemented at a Unified Data Management (UDM) function, for providing an SMF with the remote provisioning information for the UE, and for modifying the DNN subscription list of the UE, according to embodiments of the present disclosure.

FIG. 16 is a flow diagram illustrating a method 270, implemented at UDM 26, for providing SMF 24 with the remote provisioning information for UE 18 according to embodiments of the present disclosure. In some embodiments, depending on the pre-configured DNN, UDM 26 may also be configured with additional information used to control the usage of the pre-configured DNN by UE 18. Particularly, as seen in FIG. 16, UDM 26 receives a request for session subscription information for the UE (box 272). In this aspect, the request includes a UE identity. In reply to the received request, UDM 26 sends a response that includes the remote provisioning information and other needed information. This information enables UE 18 to remotely provision a UE subscription for a 5GS network (e.g., SNPN 20) and an IMS network (e.g., IMS network 14). Thereafter, UDM 26 can be configured to remove the pre-defined DNN from a DNN subscription list of the UE, and insert an IMS DNN for the IMS network into the DNN subscription list of the UE (box 276). Thereafter, responsive to a change of an IMS provider, UDM 26 may also remove the IMS DNN from the DNN subscription list of the UE, and re-insert the pre-defined DNN into the DNN subscription list of the UE (box 278).

An apparatus can perform any of the methods herein described by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the methods described herein, in several embodiments. In embodiments that employ memory, the memory stores program code that, when executed by the one or more processors, carries out the methods described herein.

Figure 17:
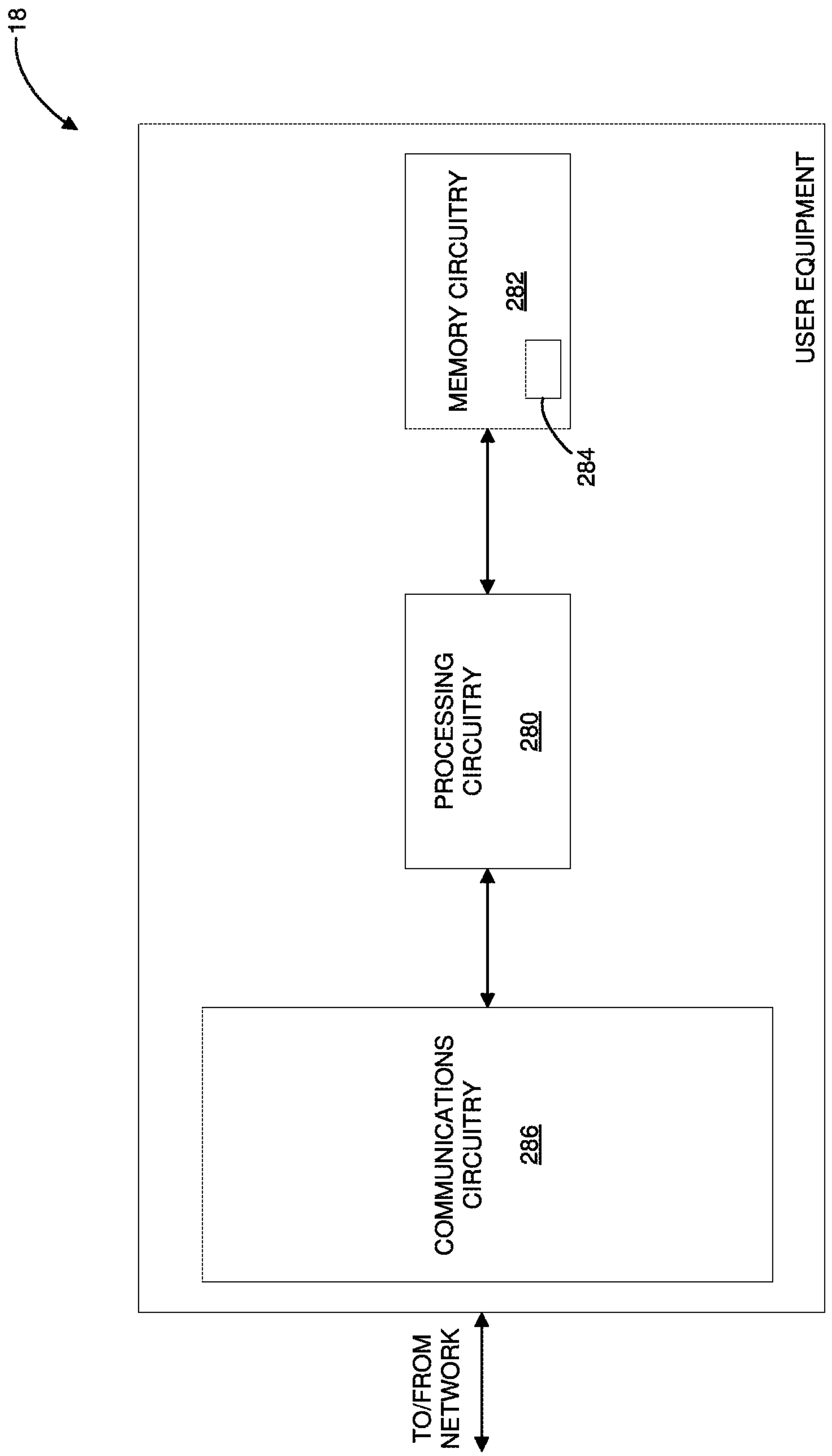
FIG. 17 is a functional block diagram of a UE configured according to one embodiment of the present disclosure.

FIG. 17, for example, is a block diagram of some functional components of a UE 18 configured according to one embodiment of the present disclosure. The UE 18 can be configured to implement the signaling procedures and methods as herein described and comprises processing circuitry 280, memory 282, and communications circuitry 286.

The communication circuitry 286 comprises interface circuitry for communicating with other core network nodes in SNPN 20 via NPN access network 16. Processing circuitry 280 controls the overall operation of the UE 18 and is configured to implement the procedures shown in FIGS. 7A-7B and in FIGS. 13A-13D. The processing circuitry 280 may comprise one or more microprocessors, hardware, firmware, or a combination thereof configured to perform method 100 shown in FIGS. 7A-7B.

Memory circuitry 282 comprises both volatile and non-volatile memory for storing computer program code and data needed by the processing circuitry 280 for operation. Memory circuitry 282 may comprise any tangible, non-transitory computer-readable storage medium for storing data including electronic, magnetic, optical, electromagnetic, or semiconductor data storage. Memory circuitry 282 stores a computer program 284 comprising executable instructions that configure the processing circuitry 280 to implement methods 100, 200, 210, 220, and 230 shown in FIGS. 7A-7B and 13A-13B. A computer program in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 284 for configuring the processing circuitry 280 as herein described may be stored in a removable memory, such as a portable compact disc, portable digital video disc, or other removable media. The computer program 284 may also be embodied in a carrier such as an electronic signal, optical signal, radio signal, or computer readable storage medium.

Figure 18:
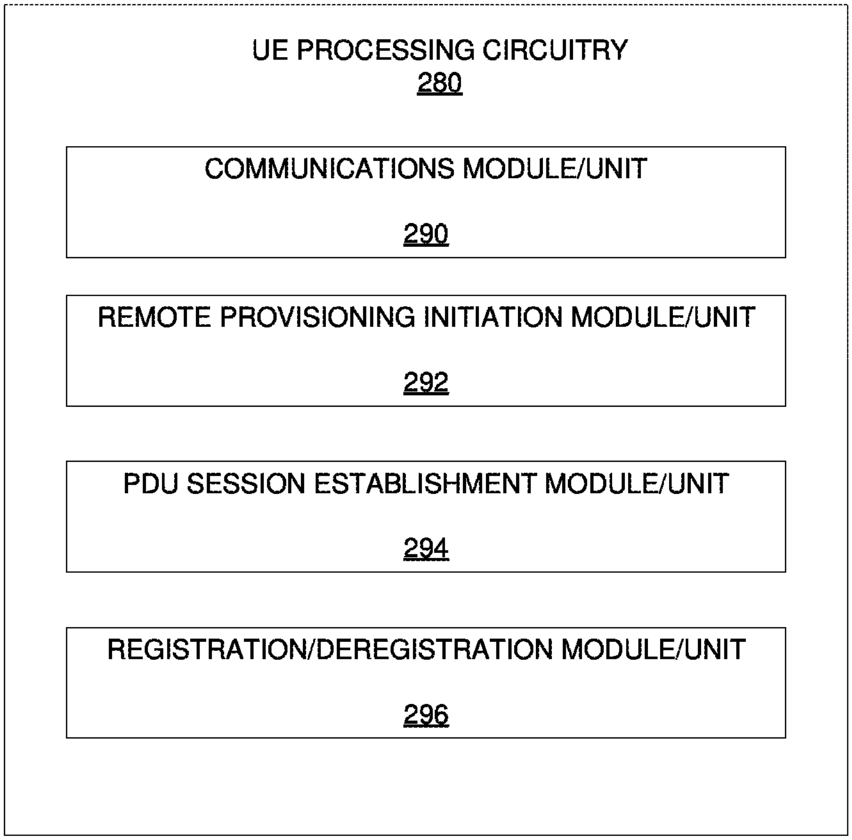
FIG. 18 illustrates a computer program product executing on the processing circuitry of a UE according to one embodiment of the present disclosure.

FIG. 18 illustrates a computer program product, such as computer program 284, executing on the processing circuitry 280 of UE 18 according to one embodiment of the present disclosure. As seen in FIG. 18, computer program 284 comprises a communications module/unit 290, a remote provisioning initiation module/unit 292, a PDU session establishment module/unit 294, and a registration/deregistration module/unit 296.

The communications module/unit 290 is configured to send and receive messages to core NPN 12 and IMS network 14 via NPN access network 16, as previously described. The remote provisioning initiation module/unit 292 is configured to determine that a remote provisioning procedure should be performed, and in response, initiate that remote provisioning procedure, as previously described. The PDU session establishment module/unit 294 is configured to establish PDU sessions with the core NPN 12 and IMS network 14, as previously described. The registration/deregistration module/unit 296 is configured to deregister and reregister UE 18 from NPN access network 16, as previously described.

Figure 19:
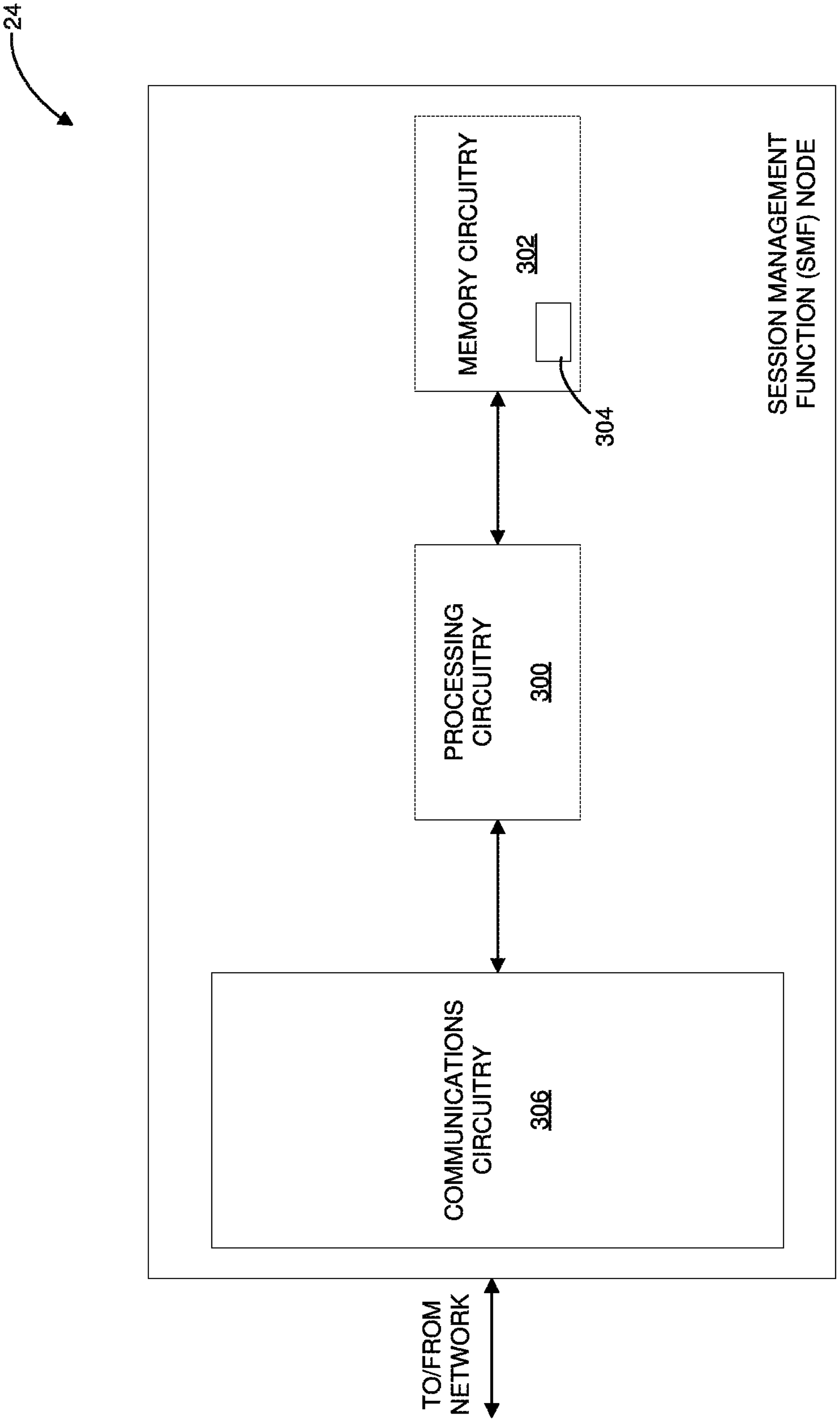
FIG. 19 is a functional block diagram of an SMF configured according to one embodiment of the present disclosure.

FIG. 19 is a block diagram of some functional components of an SMF 24 configured according to one embodiment of the present disclosure. The SMF 24 can be configured to implement the signaling procedures and methods as herein described and comprises processing circuitry 300, memory circuitry 302, and communications circuitry 306.

The communication circuitry 306 comprises interface circuitry for communicating with other core network nodes in SNPN 20, such as AMF 22 and UDM 26. Processing circuitry 300 controls the overall operation of the SMF 24 and is configured to implement the procedures shown in FIG. 8 and in FIG. 14. The processing circuitry 300 may comprise one or more microprocessors, hardware, firmware, or a combination thereof configured to perform method 120 shown in FIG. 8 and method 240 in FIG. 14.

Memory circuitry 302 comprises both volatile and non-volatile memory for storing computer program code and data needed by the processing circuitry 300 for operation.

Memory circuitry 302 may comprise any tangible, non-transitory computer-readable storage medium for storing data including electronic, magnetic, optical, electromagnetic, or semiconductor data storage. Memory circuitry 302 stores a computer program 304 comprising executable instructions that configure the processing circuitry 300 to implement methods 120 and 240 shown in FIGS. 8 and 14, respectively. A computer program in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 304 for configuring the processing circuitry 300 as herein described may be stored in a removable memory, such as a portable compact disc, portable digital video disc, or other removable media. The computer program 304 may also be embodied in a carrier such as an electronic signal, optical signal, radio signal, or computer readable storage medium.

Figure 20:
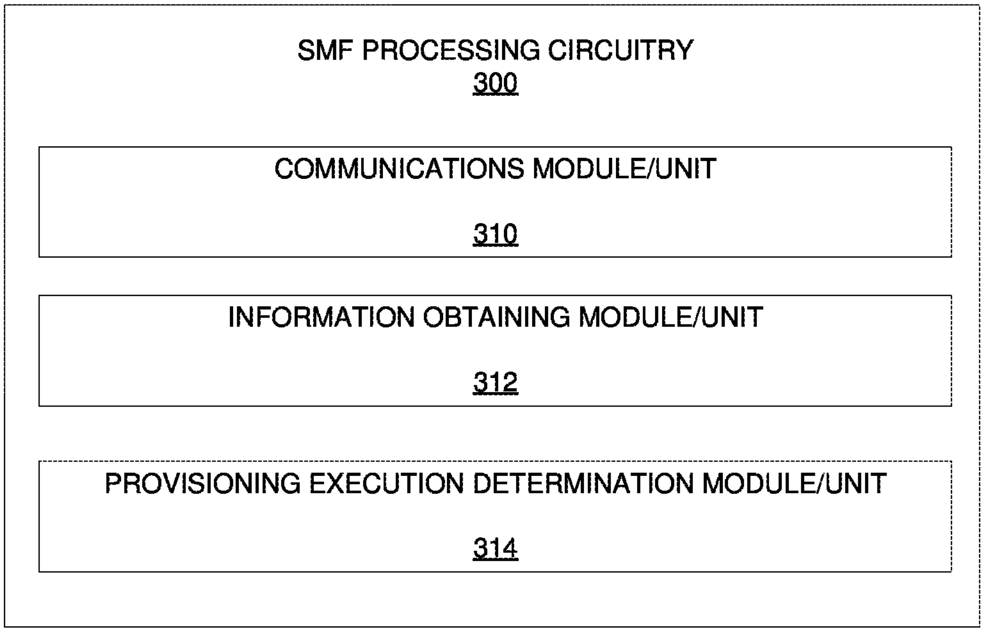
FIG. 20 illustrates a computer program product executing on the processing circuitry of an SMF according to one embodiment of the present disclosure.

FIG. 20 illustrates a computer program product, such as such as computer program 304, executing on the processing circuitry 300 of an SMF 24 according to one embodiment of the present disclosure. As seen in FIG. 20, computer program 304 comprises a communications module/unit 310, an information obtaining module/unit 312, and a provisioning execution determination module/unit 314. The communications module/unit 310 is configured to communicate messages with other network node in SNPN 20, such as the AMF 22 and the UDM 26, as previously described. The information obtaining module/unit 312 is configured to obtain the remote provisioning information from UDM 26 to send to UE 18, as previously described. The provisioning execution module/unit 314 is configured to determine whether the UE 18 should execute a remote provisioning procedure, and if so, pass the remote provisioning information obtained from UDM 26 to the UE 18, as previously described.

Figure 21:
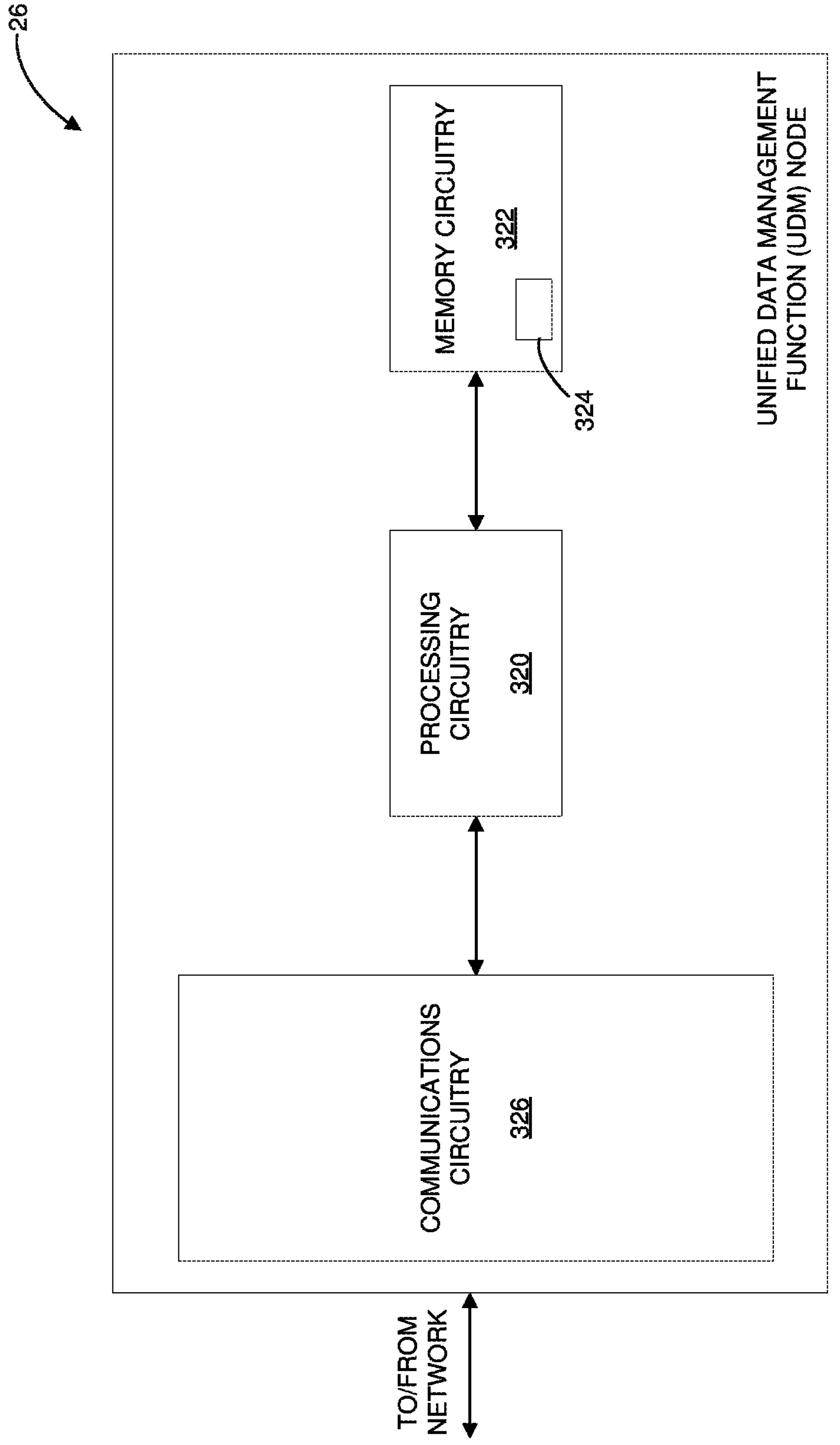
FIG. 21 is a functional block diagram of a UDM configured according to one embodiment of the present disclosure.

FIG. 21 is a block diagram of some functional components of UDM 26 configured according to one embodiment of the present disclosure. The UDM 26 can be configured to implement the signaling procedures and methods as herein described and comprises processing circuitry 320, memory circuitry 322, and communications circuitry 326.

The communication circuitry 326 comprises interface circuitry for communicating with other core network nodes in SNPN 20 and IMS network 14, such as SMF 24 and HSS 36. Processing circuitry 320 controls the overall operation of the UDM 26 and is configured to implement the procedures shown in FIGS. 9A-9C and in FIG. 15. The processing circuitry 320 may comprise one or more microprocessors, hardware, firmware, or a combination thereof configured to perform method 140 shown in FIGS. 9A-9C and 15.

Memory circuitry 322 comprises both volatile and non-volatile memory for storing computer program code and data needed by the processing circuitry 320 for operation. Memory circuitry 322 may comprise any tangible, non-transitory computer-readable storage medium for storing data including electronic, magnetic, optical, electromagnetic, or semiconductor data storage. Memory circuitry 322 stores a computer program 324 comprising executable instructions that configure the processing circuitry 320 to implement method 140 shown in FIGS. 9A-9C, and method 250 shown in FIG. 15. A computer program in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 324 for configuring the processing circuitry 320 as herein described may be stored in a removable memory, such as a portable compact disc, portable digital video disc, or other removable media. The computer program 324 may also be embodied in a carrier such as an electronic signal, optical signal, radio signal, or computer readable storage medium.

Figure 22:
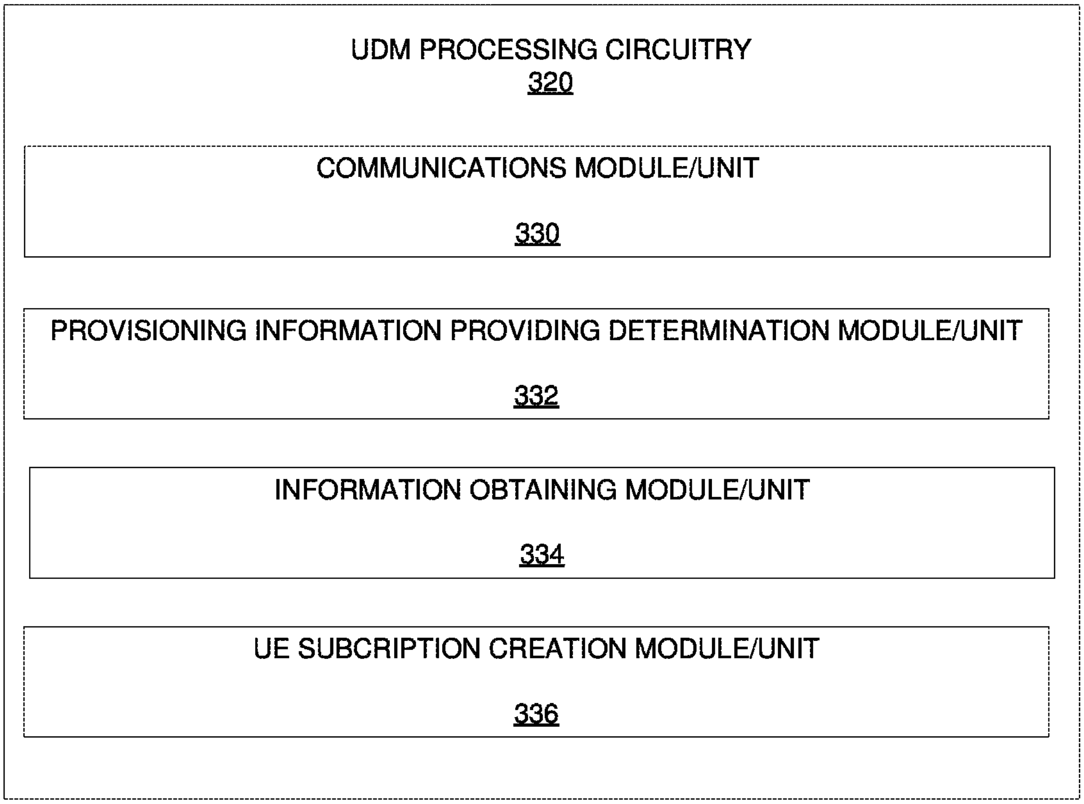
FIG. 22 illustrates a computer program product executing on the processing circuitry of a UDM according to one embodiment of the present disclosure.

FIG. 22 illustrates a computer program product, such as such as computer program 324, executing on the processing circuitry 320 of UDM 26 according to one embodiment of the present disclosure. As seen in FIG. 22, computer program 324 comprises a communications module/unit 330, a provisioning information providing determination module/unit 332, an information obtaining module/unit 334, and a UE subscription update/creation module/unit 336.

The communications module/unit 330 is configured to communicate messages with other network nodes in SNPN 20, such as the SMF 24 and other nodes in IMS network 14, as previously described. The provisioning information providing determination module/unit 332 is configured to determine, based on triggering information, whether the UE should initiate the remote provisioning process, as previously described. The information obtaining module/unit 334 is configured to obtain the remote provisioning information to send to the SMF 24, as previously described. The UE subscription update/creation module/unit 336 is configured to create a new UE profile, or update an existing UE profile, as previously described. Additionally, the UE subscription update/creation module/unit 336 is also configured to disable the triggering information at the UDM 26, as previously described.

Figure 23:
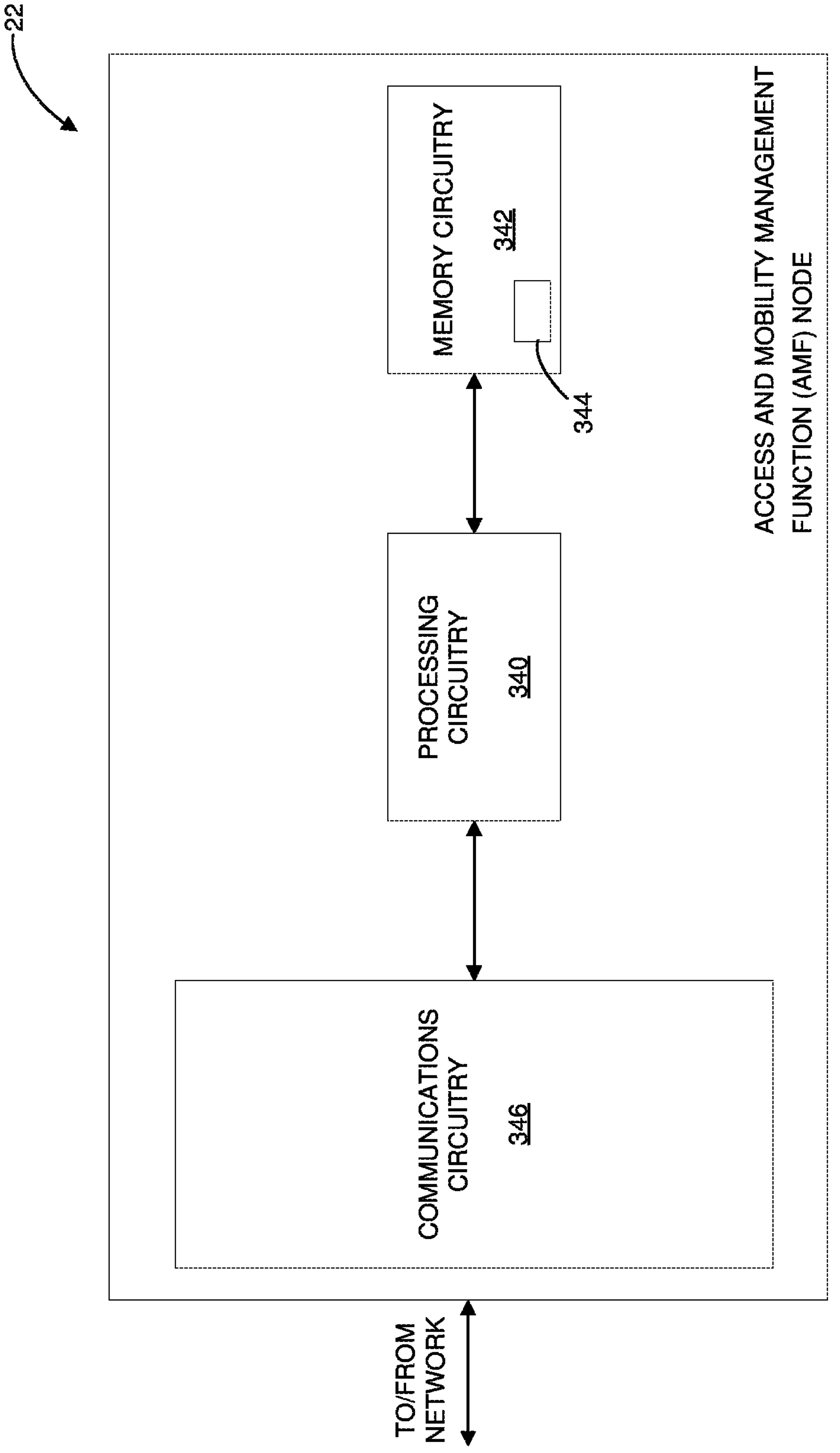
FIG. 23 is a functional block diagram of an AMF configured according to one embodiment of the present disclosure.

FIG. 23 is a block diagram of some functional components of AMF 22 configured according to one embodiment of the present disclosure. The AMF 22 can be configured to implement the signaling procedures and methods as herein described and comprises processing circuitry 340, memory circuitry 342, and communications circuitry 346.

The communication circuitry 346 comprises interface circuitry for communicating with other core network nodes in SNPN 20 and IMS network 14, such as SMF 24, and with UE 18. Processing circuitry 340 controls the overall operation of the UDM 26 and is configured to implement the procedures shown in FIG. 16. The processing circuitry 340 may comprise one or more microprocessors, hardware, firmware, or a combination thereof configured to perform method 270 shown in FIG. 16.

Memory circuitry 342 comprises both volatile and non-volatile memory for storing computer program code and data needed by the processing circuitry 340 for operation. Memory circuitry 342 may comprise any tangible, non-transitory computer-readable storage medium for storing data including electronic, magnetic, optical, electromagnetic, or semiconductor data storage. Memory circuitry 340 stores a computer program 344 comprising executable instructions that configure the processing circuitry 340 to implement method 270 shown in FIG. 16. A computer program in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 344 for configuring the processing circuitry 340 as herein described may be stored in a removable memory, such as a portable compact disc, portable digital video disc, or other removable media. The computer program 344 may also be embodied in a carrier such as an electronic signal, optical signal, radio signal, or computer readable storage medium.

Figure 24:
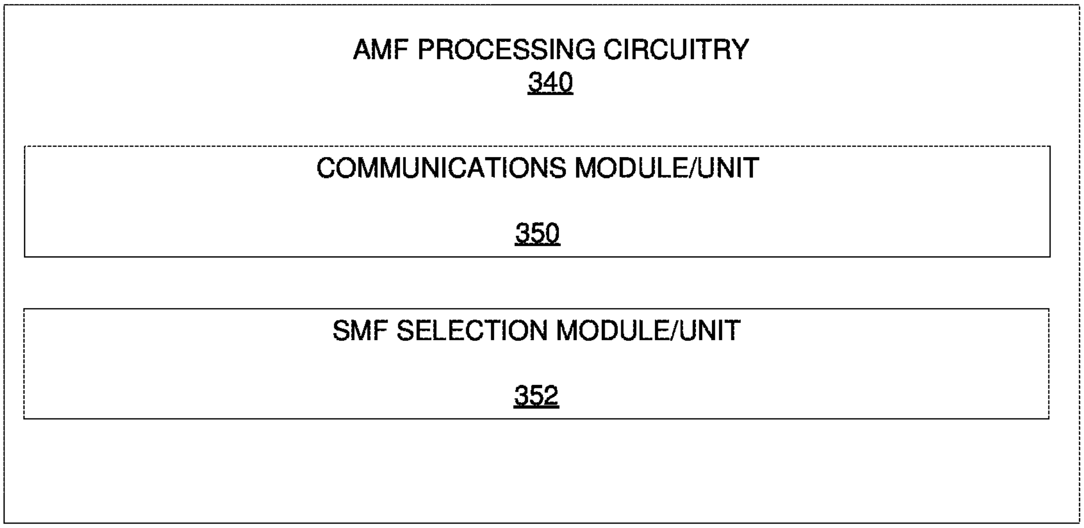
FIG. 24 illustrates a computer program product executing on the processing circuitry of an AMF according to one embodiment of the present disclosure.

FIG. 24 illustrates a computer program product, such as such as computer program 344, executing on the processing circuitry 340 of AMF 22 according to one embodiment of the present disclosure. As seen in FIG. 24, computer program 344 comprises a communications module/unit 350, and an SMF selection module/unit 352.

The communications module/unit 350 is configured to communicate messages with UE 18, as well as with other network nodes, such as those in SNPN 20 (e.g., SMF 24) and in IMS network 14, as previously described. The SMF selection module/unit 352 is configured to select an SMF 24 that may be particularly configured for remote provisioning of the UE 18, as previously described.

The present embodiments may, of course, be carried out in other ways than those specifically set forth herein without departing from essential characteristics of the embodiments. For example, in addition to the previously described aspects, one aspect of the present disclosure provides a method of acquiring User Equipment (UE) configuration/subscription data over an access/core network is provided. The method implemented by a UE and comprises sending, to a network node, a PDU session establishment request message to establish a first Protocol Data Unit (PDU) session to a Data Network Name (DNN), receiving, from the network node, a PDU session establishment accept message comprising remote provisioning information to access a remote provisioning system associated with a Non-Public Network (NPN), initiating a remote provisioning procedure (also referred to herein as an "onboarding" procedure) over the first PDU session using the remote provisioning information, receiving, from the remote provisioning system, the UE configuration/subscription data, wherein the UE configuration/subscription data comprises Internet Protocol Multimedia Subsystem (IMS) subscription data for an IMS network associated with the NPN, and responsive to determining that a connection to the IMS network associated with the NPN is required, establishing a second PDU session with the IMS network using the IMS subscription data.

In another aspect, the disclosure provides a User Equipment (UE) comprising communications circuitry and processing circuitry. The communications circuitry is configured to communicate with one or more network nodes. The processing circuitry operatively connected to the communications circuitry and configured to send, to a network node, a PDU session establishment request message to establish a first Protocol Data Unit (PDU) session to a Data Network Name (DNN), receive, from the network node, a PDU session establishment accept message comprising remote provisioning information to access a remote provisioning system associated with a Non-Public Network (NPN), initiate a remote provisioning procedure over the first PDU session using the remote provisioning information, receive, from the remote provisioning system, the UE configuration/subscription data, wherein the UE configuration/subscription data comprises Internet Protocol Multimedia Subsystem (IMS) subscription data for an IMS network associated with the NPN, and responsive to determining that a connection to the IMS network associated with the NPN is required, establish a second PDU session with the IMS network using the IMS subscription data.

Additionally, in one aspect, the present disclosure provides a non-transitory computer-readable medium storing a computer program thereon. The computer program comprises instructions that, when executed by processing circuitry of a User Equipment (UE), causes the UE to send, to a network node, a PDU session establishment request message to establish a first Protocol Data Unit (PDU) session to a Data Network Name (DNN), receive, from the network node, a PDU session establishment accept message comprising remote provisioning information to access a remote provisioning system associated with a Non-Public Network (NPN), initiate a remote provisioning procedure over the first PDU session using the remote provisioning information, receive, from the remote provisioning system, the UE configuration/subscription data, wherein the UE configuration/subscription data comprises Internet Protocol Multimedia Subsystem (IMS) subscription data for an IMS network associated with the NPN, and responsive to determining that a connection to the IMS network associated with the NPN is required, establish a second PDU session with the IMS network using the IMS subscription data.

In another aspect, the present disclosure provides a computer program comprising executable instructions that, when executed by a by processing circuitry of a User Equipment (UE), causes the UE to send, to a network node, a PDU session establishment request message to establish a first Protocol Data Unit (PDU) session to a Data Network Name (DNN), receive, from the network node, a PDU session establishment accept message comprising remote provisioning information to access a remote provisioning system associated with a Non-Public Network (NPN), initiate a remote provisioning procedure over the first PDU session using the remote provisioning information, receive, from the remote provisioning system, the UE configuration/subscription data, wherein the UE configuration/subscription data comprises Internet Protocol Multimedia Subsystem (IMS) subscription data for an IMS network associated with the NPN, and responsive to determining that a connection to the IMS network associated with the NPN is required, establish a second PDU session with the IMS network using the IMS subscription data.

In some aspects, the present disclosure provides a carrier containing a computer program according to the fourth aspect. The carrier is one of an electronic signal, optical signal, radio signal, or computer readable storage medium.

In some aspects, the present disclosure provides a method performed by a Session Management Function (SMF) node. The method comprises receiving, from a User Equipment, a session establishment request message requesting to establish a Protocol Data Unit (PDU) session for the UE to a Data Network Name (DNN), obtaining, for the UE, remote provisioning information associated with a Non Public Network (NPN), and sending a session establishment accept message to the UE, wherein the session establishment accept message comprises the remote provisioning information associated with the NPN.

In one aspect, the disclosure provides a network node configured to operate as a Session Management Function (SMF). In this aspect, the network node comprises communications circuitry and processing circuitry. The communications circuitry is configured to communicate with one or more network nodes. The processing circuitry is operatively connected to the communications circuitry and configured to receive, from a User Equipment, a session establishment request message requesting to establish a Protocol Data Unit (PDU) session for the UE to a Data Network Name (DNN), obtain, for the UE, remote provisioning information associated with a Non Public Network (NPN), and send a session establishment accept message to the UE, wherein the session establishment accept message comprises the remote provisioning information associated with the NPN.

In another, the disclosure provides a non-transitory computer-readable medium storing a computer program thereon. The computer program comprises instructions that, when executed by processing circuitry of a Session Management Function (SMF) node, causes the SMF to receive, from a User Equipment, a session establishment request message requesting to establish a Protocol Data Unit (PDU) session for the UE to a Data Network Name (DNN), obtain, for the UE, remote provisioning information associated with a Non Public Network (NPN), and send a session establishment accept message to the UE, wherein the session establishment accept message comprises the remote provisioning information associated with the NPN.

In yet another, the disclosure provides a computer program comprising executable instructions that, when executed by a by processing circuitry of a Session Management Function (SMF) node, causes the SMF to receive, from a User Equipment, a session establishment request message requesting to establish a Protocol Data Unit (PDU) session for the UE to a Data Network Name (DNN), obtain, for the UE, remote provisioning information associated with a Non Public Network (NPN), and send a session establishment accept message to the UE, wherein the session establishment accept message comprises the remote provisioning information associated with the NPN.

In some aspects, the disclosure provides a carrier containing a computer program according to the ninth aspect, wherein the carrier is one of an electronic signal, optical signal, radio signal, or computer readable storage medium.

In one aspect, the disclosure provides a method for providing User Equipment (UE) subscription data associated with a Non-Public Network (NPN). The method is implemented by a Unified Data Management (UDM) node and comprises receiving a request for session subscription information for the UE, wherein the request includes a UE identity, and sending, in reply to the request, a response comprising the remote provisioning information to enable the UE to remotely provision an IMS subscription.

In another aspect, the disclosure provides a network node configured to operate as a Unified Data Management (UDM) node. The network node comprises communications circuitry and processing circuitry. The communications circuitry is configured to communicate with one or more nodes in the NPN network and in an Internet Protocol (IP) Multimedia Subsystem (IMS) network. The processing circuitry is operatively connected to the communications circuitry and configured to receive a request for session subscription information for the UE, wherein the request includes a UE identity, and send, in reply to the request, a response comprising the remote provisioning information to enable the UE to remotely provision an IMS subscription.

In some aspects, the disclosure provides a non-transitory computer-readable medium storing a computer program thereon. The computer program comprises instructions that, when executed by processing circuitry of a Unified Data Management (UDM) node, causes the UDM node to receive a request for session subscription information for the UE, and send, in reply to the request, a response comprising the remote provisioning information for the UE.

In one aspect, the disclosure provides a computer program comprising executable instructions that, when executed by a by processing circuitry of a Unified Data Management (UDM) node, causes the UDM to receive a request for session subscription information for the UE, and send, in reply to the request, a response comprising the remote provisioning information for the UE.

In another aspect, the disclosure provides a carrier containing a computer program according to the fourteenth aspect, wherein the carrier is one of an electronic signal, optical signal, radio signal, or computer readable storage medium.

Therefore, the present embodiments are therefore to be considered in all respects as illustrative and not restrictive, and all changes coming within the meaning and equivalency range of the appended embodiments are intended to be embraced therein.

The invention claimed is:

1. A method of acquiring User Equipment, UE, configuration/subscription data over an access/core network, the method implemented by a UE and comprising:
   - establishing a first Protocol Data Unit, PDU, session with a pre-defined Data Network Name, DNN, for remote provisioning, wherein establishing the first PDU session with the remote provisioning DNN comprises:
     - sending, to a Session Management Function, SMF, in a network, a PDU session establishment request message including the pre-defined DNN; and
     - receiving, responsive to the PDU session establishment request message, a PDU session establishment accept message including UE Session Management Subscription data having one or more Information Elements, IEs, associated with the pre-defined DNN, wherein receiving the PDU session establishment accept message automatically triggers initiation of an onboarding procedure and wherein the remote provisioning information used the initiation of the onboarding procedure is included in the one or more IEs;
   - initiating the onboarding procedure over the first PDU session using the remote provisioning information that enables the UE to access a remote provisioning system in the pre-defined DNN;
   - receiving, from the remote provisioning system, the UE configuration/subscription data, wherein the UE configuration/subscription data comprises Internet Protocol Multimedia Subsystem, IMS, subscription data for an IMS network associated with a Non-Public Network, NPN; and
   - responsive to determining that a connection to the IMS network associated with the NPN is required, establishing a second PDU session with the IMS network using the IMS subscription data; and
   - wherein the remote provisioning information used to initiate trigger initiation of the onboarding procedure that enables the UE to access the remote provisioning system comprises both the pre-defined DNN and a packet filter that limits traffic from the UE over the PDU session to the provisioning system.

2. The method of claim 1 wherein the pre-defined DNN triggers the network receiving the PDU session establishment request message to select a Session Management Function, SMF, and a User Plane Function, UPF, for providing the remote provisioning information used to initiate the onboarding procedure to the UE.

3. The method of claim 1 wherein the UE is pre-configured with the pre-defined DNN, and wherein the pre-defined DNN comprises a dedicated DNN for remotely provisioning the UE.

4. The method of claim 1 wherein the DNN is an internet DNN.

5. The method of claim 1 wherein the PDU session establishment request message further includes a pre-defined PDU session establishment request type used for remote provisioning of the UE.

6. The method of claim 4, wherein the UE is further configured with the packet filter that limits the traffic from the UE over the PDU session to the provisioning system, and wherein the UE is limited to communicate only with the provisioning system over the PDU session until:

the PDU session is released; or the UE receives an update to allow internet traffic to be used over the PDU session to the internet DNN or to the pre-defined DNN following successful provisioning.

7. The method of claim 1 wherein the pre-defined DNN is a dedicated DNN that enables the UE to establish communications only with the remote provisioning system.

8. The method of claim 1 wherein the IMS subscription data comprises an IMS DNN.

9. The method of claim 1 wherein the provisioning request further includes a temporary Subscription Permanent Identifier (SUPI) for the UE.

10. The method of claim 9 wherein the provisioning request further includes provisioning/subscription information enabling the UE to access the IMS network via a 5GS network.

11. The method of claim 9 further comprising, prior to establishing the second PDU session for IMS:

de-registering from the access/core network if the UE has used the temporary SUPI; and re-registering with the access/core network using the SUPI assigned to the UE.

12. A User Equipment, UE, comprising:

communications circuitry configured to communicate with one or more network nodes; and processing circuitry operatively connected to the communications circuitry and configured to:

establish a first Protocol Data Unit, PDU, session with a pre-defined Data Network Name, DNN, for remote provisioning, wherein to establish the first PDU session with the remote provisioning DNN, the processing circuitry is configured to:

send, to a Session Management Function, SMF, in a network, a PDU session establishment request message including the pre-defined DNN; and receive, responsive to the PDU session establishment request message, a PDU session establishment accept message including UE Session Management Subscription data having one or more Information Elements, IEs, associated with the pre-defined DNN, wherein receipt of the PDU session establishment accept message automatically triggers initiation of an onboarding procedure, and wherein the remote provisioning information used the initiation of the onboarding procedure is included in the one or more IEs;

initiate the onboarding procedure over the first PDU session using the remote provisioning information that enables the UE to access a remote provisioning system in the pre-defined DNN;

receive, from the remote provisioning system, UE configuration/subscription data, wherein the UE configuration/subscription data comprises Internet Protocol Multimedia Subsystem, IMS, subscription data for an IMS network associated with a Non-Public Network, NPN; and responsive to determining that a connection to the IMS network associated with the NPN is required, establish a second PDU session with the IMS network using the IMS subscription data; and wherein the remote provisioning information used to initiate the onboarding procedure that enables the UE to access the remote provisioning system comprises both the pre-defined DNN and a packet filter that limits traffic from the UE over the PDU session to the provisioning system.

* * * * *